United States Patent
Chizawa et al.

(10) Patent No.: US 8,173,314 B2
(45) Date of Patent: May 8, 2012

(54) FUEL CELL POWER GENERATION SYSTEM, ITS STOPPING/SAFEKEEPING METHOD AND PROGRAM

(75) Inventors: Hiroshi Chizawa, Minato-ku (JP); Yasuji Ogami, Minato-ku (JP)

(73) Assignee: Toshiba Fuel Cell Power Systems Corporation, Tokyo (JP)

( * ) Notice: Subject to any disclaimer, the term of this patent is extended or adjusted under 35 U.S.C. 154(b) by 1041 days.

(21) Appl. No.: 11/719,546

(22) PCT Filed: Nov. 15, 2005

(86) PCT No.: PCT/JP2005/020936
§ 371 (c)(1),
(2), (4) Date: Mar. 28, 2008

(87) PCT Pub. No.: WO2006/054548
PCT Pub. Date: May 26, 2006

(65) Prior Publication Data
US 2009/0148730 A1    Jun. 11, 2009

(30) Foreign Application Priority Data
Nov. 17, 2004    (JP) .................................. 2004-333440

(51) Int. Cl.
*H01M 8/04* (2006.01)
(52) U.S. Cl. .................. 429/431; 429/429; 429/440
(58) Field of Classification Search .......... 429/428–451
See application file for complete search history.

(56) References Cited

U.S. PATENT DOCUMENTS
5,527,632 A * 6/1996 Gardner ........................ 429/425
6,399,231 B1 * 6/2002 Donahue et al. .............. 429/431

FOREIGN PATENT DOCUMENTS
DE    101 96 359 T1    7/2003
(Continued)

OTHER PUBLICATIONS
AIPA Machine translation of JP2002-093448 printed May 22, 2011.*

*Primary Examiner* — Barbara Gilliam
*Assistant Examiner* — Maria J Laios
(74) *Attorney, Agent, or Firm* — Oblon, Spivak, McClelland, Maier & Neustadt, L.L.P.

(57) ABSTRACT

A fuel cell power system includes a fuel cell stack prepared by stacking a plurality of electric cells, each having an anode and a cathode with an electrolyte therebetween, a fuel supply line and an oxidant supply line that respectively supply a fuel and an oxidant to the fuel cell stack, and a fuel exhaust line and an oxidant exhaust line that respectively exhaust the fuel and oxidant supplied to the fuel cell stack. A method for retaining a power generation-suspended state of the fuel cell power system in a process of bringing the fuel cell power system into the power generation-suspended state and retaining the suspended state includes the steps of: closing the oxidant supply line in the course of bringing the fuel cell power system into the power generation-suspended state; applying a direct current from the cathode to the anode through an external circuit with the oxidant supply line closed by the step of closing the oxidant supply line until the electric cell voltage with reference to the anode comes to a level of more than −1.2 V to less than 0.1 V; closing the oxidant exhaust line after the start point of the step of applying a direct current; and closing the fuel exhaust line and the fuel supply line after the termination point of the step of applying a direct current.

16 Claims, 16 Drawing Sheets

FOREIGN PATENT DOCUMENTS

| | | |
|---|---|---|
| DE | 11 2004 002 405 T5 | 12/2006 |
| JP | 63 116373 | 5/1988 |
| JP | 1 200567 | 8/1989 |
| JP | 2 270267 | 11/1990 |
| JP | 2002-93448 | 3/2002 |
| JP | 2003 168453 | 6/2003 |
| JP | 2003 217631 | 7/2003 |
| JP | 2003-272686 | 9/2003 |
| JP | 2004-6166 | 1/2004 |

* cited by examiner

FUEL CELL POWER GENERATION SYSTEM, ITS STOPPING/SAFEKEEPING METHOD AND PROGRAM

TECHNICAL FIELD

The present invention relates to a fuel cell system that generates power by an electrochemical reaction occurring by supplying a fuel and an oxidant to a fuel cell stack prepared by stacking a plurality of electric cells, and also relates to a technique for retaining and controlling a power generation-suspended state at a time of suspending the power generation.

BACKGROUND ART

A fuel cell power system is an apparatus that electrochemically converts the chemical energy of a fuel, such as hydrogen, into an electrical energy by supplying the fuel and an oxidant, such as air, to a fuel cell proper to react and then extracts the electrical energy. The fuel cell power system is relatively small but functions efficiently, and operates environmentally friendly. In addition, it can be used as a cogeneration system by recovering heat generated by power generation to produce hot water or steam.

Such fuel cells are classified into various types depending on the type of electrolyte. Among these fuel cells, solid polymer fuel cells using a solid polymer electrolyte membrane as the electrolyte can operate at low temperatures and exhibit high power density, and is accordingly suitable for use as a small cogeneration system provided with an eye to general household use or as a motive power source of electric vehicles. It is thus expected that the market scale of solid polymer fuel cells will expand rapidly.

The solid polymer fuel cell power system, for example, a small cogeneration system for general household use, includes: a reformer that produces a hydrogen-containing gas from a hydrocarbon fuel represented by town gas or LPG; a fuel cell stack that generates an electromotive force by supplying the hydrogen-containing gas produced by the reformer and ambient air to a anode and an cathode respectively; an electrical controller that supplies electric energy generated in the fuel cell stack to an external load; and a thermal recycling system that recovers heat generated through the power generation.

A fuel is thus supplied to the fuel cell power system so as to operate it, and as the power generation efficiency, which is defined by a percentage of output to the amount of fuel supplied, is increased, fuel consumption can be reduced and user advantages can be increased. Hence, the power generation efficiency is an index of the performance of the fuel cell power system.

The fuel cell stack, which actually functions to generate power in the fuel cell power system, decreases in voltage with time due to various factors associated with the operation, consequently reducing the power generation efficiency of the fuel cell power system. In order to achieve a fuel cell power system exhibiting a high power generation, efficiency, it is most important that the voltage of the fuel cell stack is prevented from decreasing with time.

In general, the operation of the fuel cell power system is suspended in regular intervals according to the power demand of the user. While the suspended state is retained with the reaction gas supply stopped, air enters the anode and cathode of the fuel cell from the outside. If a hydrogen-rich gas is supplied to the anode at start-up with oxygen present at both the anode and the cathode, the catalyst of the cathode is locally degraded to reduce the voltage of the fuel cell stack. It is therefore necessary to reduce at least the partial pressure of oxygen in the cathode in advance.

In order to reduce the oxygen partial pressure in the cathode, some methods have been known. For example, the oxygen may be purged with nitrogen before starting the operation of the fuel cell power system, or when a fuel is supplied, a fixed load may be connected so that oxygen remaining in the cathode is consumed. If the cathode is allowed to stand in an oxygen atmosphere while the suspended state of the fuel cell system is retained, the catalyst of the cathode is sintered by the cathode kept high potential, or the electrolyte membrane is degraded by oxygen permeating the oxygen anode. Therefore, the cathode is preferably held in a reducing atmosphere even while the suspended state is retained.

For suspending power generation, in a widely employed practice, the oxygen partial pressure of the cathode is reduced by, for example, nitrogen purge, and then the fuel cell is sealed (see, for example, Patent Document 1: Japanese Unexamined Patent Application Publication No. 2004-6166). Alternatively, water is electrolyzed with the fuel cell connected to an external power supply, and the cathode is filled with hydrogen-containing gas. Then, the fuel cell is sealed (see, for example, Patent Document 2: Japanese Unexamined Patent Application Publication No. 2002-93448). This technique allows complete removal of residual oxygen from the cathode, which is difficult for the technique using nitrogen purge.

However, the methods for retaining the suspended state of the known fuel cell power system provide the following disadvantages.

In the method described in the Patent Document 1, a small amount of air gradually enters the fuel cell from the outside while the suspended state is retained because of the aged degradation and functional limit of the sealant. As a result, the time for which the fuel cell is held in a reducing atmosphere is reduced. Therefore, the method of the Patent Document 1 is not suitable for long-time suspension.

On the other hand, the method described in the Patent Document 2 overcomes the disadvantage of the method described in the Patent Document 1. However, in order to electrolyze water to generate hydrogen in the cathode, the voltage applied to the anode of the fuel cell needs to be set at least the equilibrium potential 1.22 V under standard conditions. Since the anode is thus kept at a high potential, the catalyst is sintered or its carrier carbon is corroded, degrading the catalyst undesirably.

If an alloy catalyst having high CO resistance, such as PtRu, is used as the catalyst of the anode, elution of constituents of the alloy, such as Ru, is accelerated by the increase of the potential of the anode, thereby reducing the CO resistance.

Solid polymer fuel cells require that the electrolyte membrane are wetted with a predetermined amount of water and hold the water. If the water is electrolyzed while the suspended state is retained, the water content in the electrolyte membrane is reduced accompanying the consumption of the water, so that the performance of the fuel cell is degraded after restarting the operation.

The present invention was conceived to overcome the above-described disadvantages, and an object of the invention is to provide a fuel cell power system that can prevent the degradation of the catalyst by suppressing the increase of the oxygen partial pressure in the fuel cell stack over a long time and thus can prevent the degradation of the performance of the fuel cell caused when the fuel cell power system is brought into the power generation-suspended state or retains the suspended state, and also to provide a method and a program for retaining the suspended state.

DISCLOSURE OF THE INVENTION

In order to accomplish the object, the present invention achieves a hydrogen pump as expressed by the following reaction formula, by applying a direct current from the cathode to the anode through an external circuit with hydrogen-rich gas supplied to the anode after closing an oxidant supply line in the course of bringing the fuel cell power system into a power generation-suspended state, until the electric cell voltage with reference to the anode comes to a level of more than −1.2 V to less than 0.1 V. The hydrogen pump transfers the hydrogen from the anode to the cathode to fill the cathode without keeping the anode at a high potential. The hydrogen enclosed consumes the oxygen coming from the outside while the suspended state is retained, thus suppressing the increase in potential caused by increase in oxygen partial pressure.

Anode: $H_2 \rightarrow 2H^+ + 2e^-$

Cathode: $2H^+ + 2e^- \rightarrow H_2$

A method for retaining a suspended state of the present invention performs steps described below in a process of bringing a fuel cell power system into a power generation-suspended state and retaining the suspended state. The fuel cell power system includes a fuel cell stack prepared by stacking a plurality of electric cells, each having an anode and a cathode with an electrolyte therebetween, a fuel supply line and an oxidant supply line that respectively supply a fuel and an oxidant to the fuel cell stack, a fuel exhaust line and an oxidant exhaust line that respectively exhaust the fuel and the oxidant supplied to the fuel cell stack.

First, in the course of bringing the fuel cell power system into the power generation-suspended state, the oxidant supply line closing step of closing the oxidant supply line is performed. Then, a direct current applying step is performed with the oxidant supply line closed by the oxidant supply line closing step. The direct current applying step passes a direct current from the cathode to the anode through an external circuit until the electric cell voltage with reference to the anode comes to a level of more than −1.2 V to less than 0.1 V. After the start point of the direct current applying step, an oxidant exhaust line closing step, which closes the oxidant exhaust line, is performed. After the termination point of the direct current applying step, a fuel exhaust/supply line closing step, which closes the fuel exhaust line and the fuel supply line, is performed.

A suspended state-retaining program and a fuel cell power system, according to the present invention embody the features of the above-described suspended state-retaining method in a computer program and a system.

According to the present invention of the characteristic features mentioned above, not only the anode but also the cathode is filled with a hydrogen-rich gas by electrochemically transferring the hydrogen-rich gas supplied to the anode to the cathode, in the course of bringing the fuel cell power system into the power generation-suspended state. Since the enclosed hydrogen consumes oxygen coming from the outside while the suspended state is retained, the oxygen partial pressures in the anode and the cathode are prevented from increasing while the suspended state is retained.

Consequently, the present invention can prevent the sintering of the catalyst, which is caused by the cathode kept at a high potential by increasing the oxygen partial pressure while the suspended state is retained, and the degradation of the catalyst of the cathode, which occurs when the hydrogen-rich gas is supplied with oxygen present in both electrodes. Thus, the reduction of the effective surface area of the catalyst, can be prevented and the reduction of the fuel cell stack voltage resulting from the reduction of the effective surface area of the catalyst can be prevented.

In addition, the sintering caused by the anode kept at a high potential can be prevented by electrochemically transferring the hydrogen-rich gas supplied to the anode to the cathode without keeping the anode at a high potential, unlike the case of the electrolysis of water.

The present invention can provide a fuel cell power system, and a method, and a program for retaining a suspended state of the system. These system, method, and program can prevent the increase of the oxygen partial pressure inside the fuel cell stack so as to prevent the degradation of the catalyst over a long time and can thus prevent the degradation of the fuel cell performance involved in bringing the fuel cell power system into the power generation-suspended state and retaining the suspended state, by applying a direct current from the cathode to the anode through an external circuit after closing the oxidant supply line in the course of bringing the fuel cell power system into the power generation-suspended state until the electric cell voltage with reference to the anode comes to a level of more than −1.2 V to less than 0.1 V.

The fuel cell power system embodying the method and the program for retaining the suspended state includes: a fuel cell stack including a plurality of electric cells stacked one on top of another, each electric cell including a anode and an cathode with an electrolyte therebetween; a fuel supply line and an oxidant supply line that respectively supply a fuel and an oxidant to the fuel cell stack; a fuel exhaust line and an oxidant exhaust line that respectively exhaust the fuel and the oxidant supplied to the fuel cell stack; an electrical control unit having a normal load operation mode in which electric energy generated in the fuel cell stack is delivered to an external load and a current source mode in which a direct current is passed from the cathode to the anode through an external circuit when the fuel cell stack has no electromotive force; and a system control unit that controls the fuel supply line and oxidant supply line and the electrical control unit. The system control unit closes the oxidant supply line in the course of suspending power generation, switches the electrical control unit from the load operation mode to the current source mode to pass the direct current from the cathode to the anode through the external circuit with the oxidant supply line closed in the course of suspending power generation and stops the electrical control unit at a point when the electric cell voltage with reference to the anode comes to a level of more than −1.2 V to less than 0.1 V, closes the oxidant exhaust line after a point when the electrical control unit is switched to the current source mode, and closes the fuel exhaust line and the fuel supply line after a point when the electrical control unit is stopped at the current source mode. The system control unit of the fuel cell power system includes a memory in which an operational sequence program has been stored in advance, and a CPU that reads the sequence program and issues a control command through an input/output portion. The system further includes a reformer provided in the fuel supply line and an air blower provided in the oxidant supply line. The reformer and the air blower are controlled by the system controller, thereby controlling the supplies of reformed gas (hydrogen) used as the fuel and air used as the oxidant.

BEST MODE FOR CARRYING OUT THE INVENTION

Embodiments to which the present invention is applied will be described in detail hereunder with reference to the accompanying drawings.

[First Embodiment]
[Structure]

Figure 1:
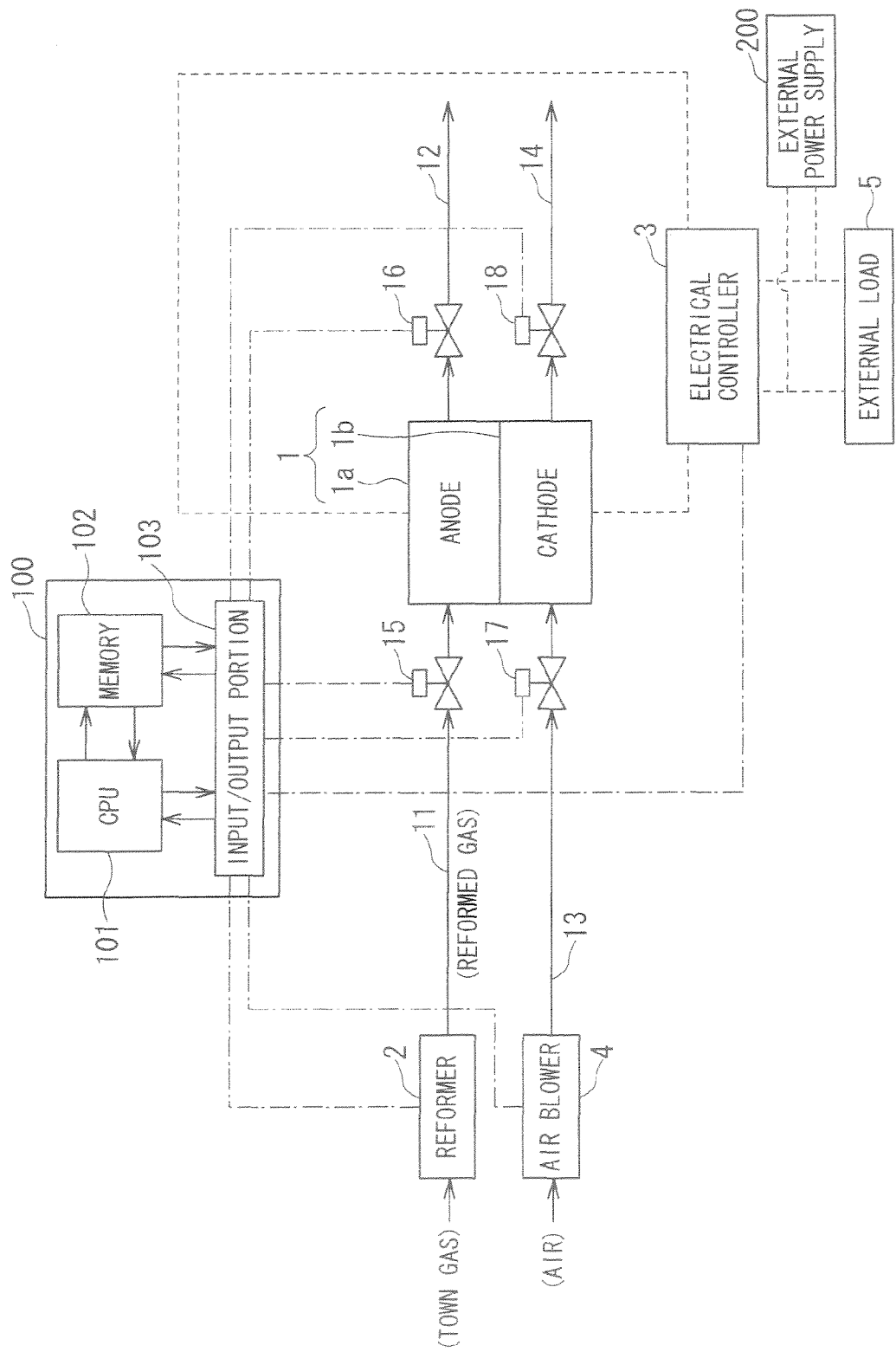
FIG. 1 is a block diagram of a fuel cell power system according to a first embodiment to which the present invention is applicable.

FIG. 1 is a block diagram of a fuel cell power system according to a first embodiment to which the present invention is applied. The solid lines connecting blocks in the figure represent gas connections and the broken lines and chain lines represent electrical connections.

As shown in FIG. 1, the fuel cell power system of the first embodiment includes a fuel cell stack 1, a reformer 2, and an electrical controller 3. While the fuel cell stack 1 in practice is constituted of a plurality of electric cells stacked one on top of another. Each electric cell including an anode and a cathode disposed with an electrolyte therebetween. The fuel cell stack 1 shown in the figure is depicted as if it were composed of an anode 1a and a cathode 1b for the sake of simplicity.

A reformed gas prepared by steam-reforming town gas by the reformer 2 is supplied to the anode 1a of the fuel cell stack 1 through a fuel supply line 11 and is exhausted through a fuel exhaust line 12. The cathode 1b receives air from an air blower 4 through an oxidant supply line 13. The air is exhausted through the oxidant exhaust line 14. Electric energy generated in the fuel cell stack 1 is delivered to an external load 5. such as a motor, by the electrical controller 3.

The electrical controller 3 has a normal, load operation mode in which the electric energy generated in the fuel cell stack 1 is delivered to the external load 5, and a current source mode in which a direct current is passed from the cathode 1b to the anode 1a through the electrical controller 3 and an external circuit including an external power supply 200 when the fuel cell stack 1 has no electromotive force. A system controller 100 directs the reformer to control the amount of reformed gas, and a mount of reformed gas according to the magnitude of the direct current is supplied to the anode 1a.

The lines 11 to 14 through which the reformed gas or air is supplied to or exhausted from the fuel cell stack 1 have valves 15 to 18 respectively to seal the fuel cell stack 1. More specifically, an anode inlet valve 15 for closing the fuel supply line 11 is provided at the entrance to the anode 1a, and an anode outlet valve 16 for closing the fuel exhaust line 12 is provided at the exit of the anode 1a. Further, a cathode inlet valve 17 for closing the oxidant supply line 13 is provide at the entrance to the cathode 1b, and a cathode outlet valve 18 for closing the oxidant exhaust line 14 is provided at the exit of the cathode 1b.

Each of the above-described components of the fuel cell power system is controlled by control commands from the system controller 100. More specifically, the electrical controller 3 switches the mode and starts or stops the operation according to the control command from the system controller 100. The reformer 2, the air blower 4, and the four valves 15 to 18 are also controlled to start or stop, or open or close by the control command from the system controller 100.

The system controller 100 includes a CPU 101, a memory 102, and an input/output portion (member) 103. The CPU 101 reads an operational sequence program from the memory 102 that has stored the sequence program in advance, and issues control commands for opening or closing the valves, controlling the output of the blower, controlling the reformer, or switching the operational mode of the electrical controller through the input/output portion 103 according to the sequence program. The dotted-chain lines shown in the figure represent signals, such as of control commands, exchanged between the system controller 100 and the components.

The system controller 100 is embodied by, for example, a microcomputer storing a program specialized for retaining the suspended state according to the invention.

[Procedure for Suspending Power Generation]

Figure 2:
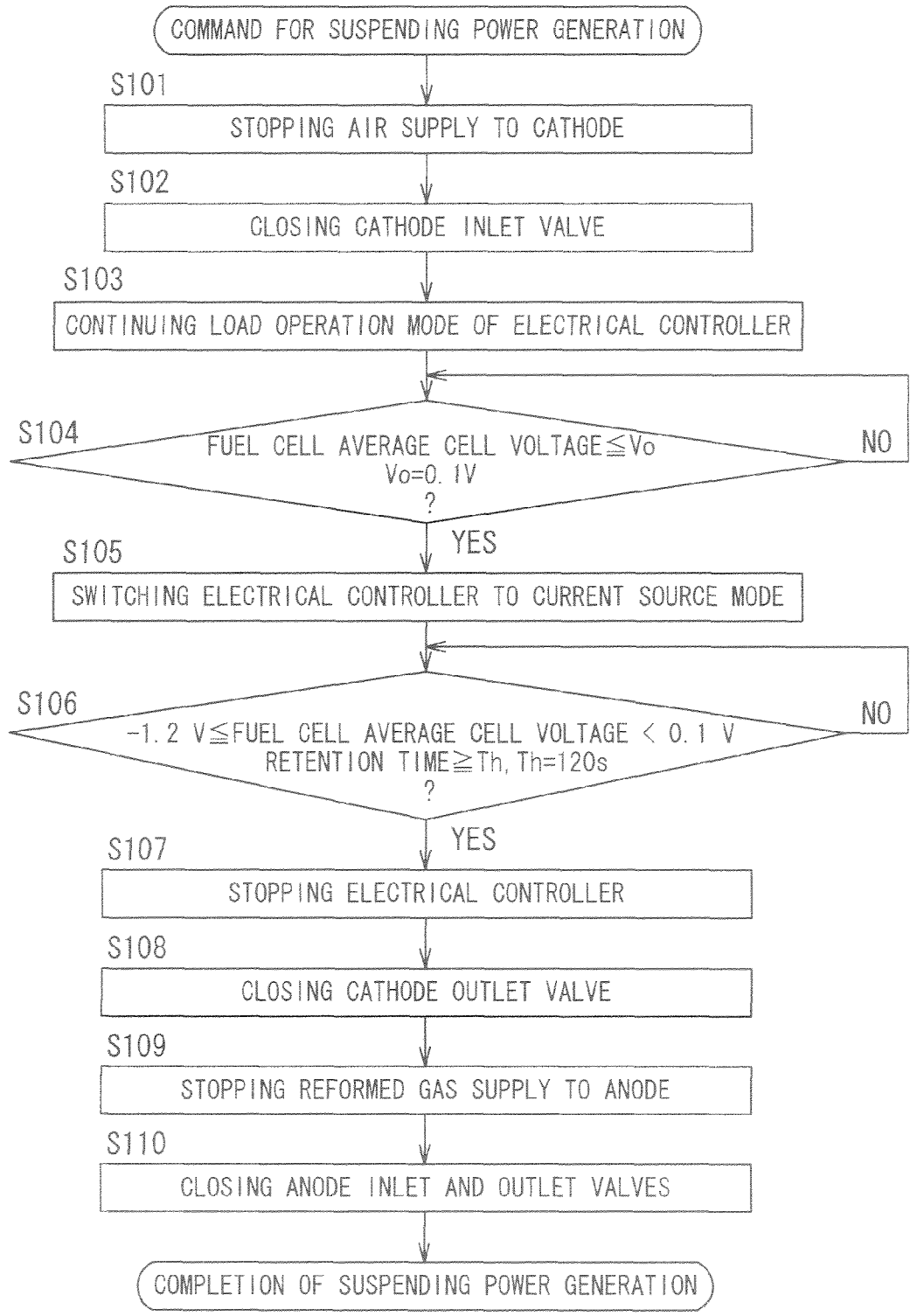
FIG. 2 is a flow chart of a procedure for bringing the fuel cell power system into a power generation-suspended state in a method for retaining the suspended state according to the first embodiment.

FIG. 2 is a flow chart of a procedure for bringing the fuel cell power system into a power generation-suspended state in the method for retaining the suspended sate according to the present embodiment. As shown in FIG. 2, when the system controller 100 issues a command to suspend power generation while the fuel cell power system is operated to generate power, the air supply to the cathode 1b from the air blower 4 is stopped (S101), the cathode inlet valve 17 provided in the oxidant supply line 13 is closed (S102), and the load operation mode is continued (S103) by the external power supply 200 of the external circuit including the electrical controller 3. The load operation mode is continued (NO in S104) until the electric cell voltage (average cell voltage of the fuel cell stack 1) with reference to the anode 1a is reduced to a preset mode switching voltage $V_0$. The mode switching voltage is set at, for example, $V_0=0.1$ V.

When the electric cell voltage with reference to the anode 1a decreases to 0.1 V (YES in S104), the electrical controller 3 is switched to the current source mode from the load operation mode, and a direct current is passed to the anode 1a from the cathode 1b through the external circuit including the electrical controller 3 (S105). The current source mode is continued for a period until the electric cell voltage with reference to the anode 1a is reduced to a level of more than −1.2 V to less than 0.1 V and then for a preset retention time Th (NO in S106). In the present embodiment, the retention time is set, for example, at Th=120 seconds.

Then the electrical controller 3 is stopped (S107) at the point when 120 seconds elapse (YES in S106) after the electric cell voltage with reference to the anode 1a is reduced to a level more than −1.2 V to less than 0.1 V. Then, the cathode outlet valve 18 provided in the oxidant exhaust line 14 is closed (S108) to stop the supply of the reformed gas from the reformer 2 to the anode 1a (S109). The anode inlet valve 15 provided in the fuel supply line 11 and the anode outlet valve 16 provided in the fuel exhaust line 12 are closed (S110) to seal the fuel cell stack 1, and thus the power generation is completely suspended. As a result of the operation for suspending power generation, the fuel cell power system is brought into a state where the suspended state is retained.

[Procedure for Starting Power Generation]

Figure 3:
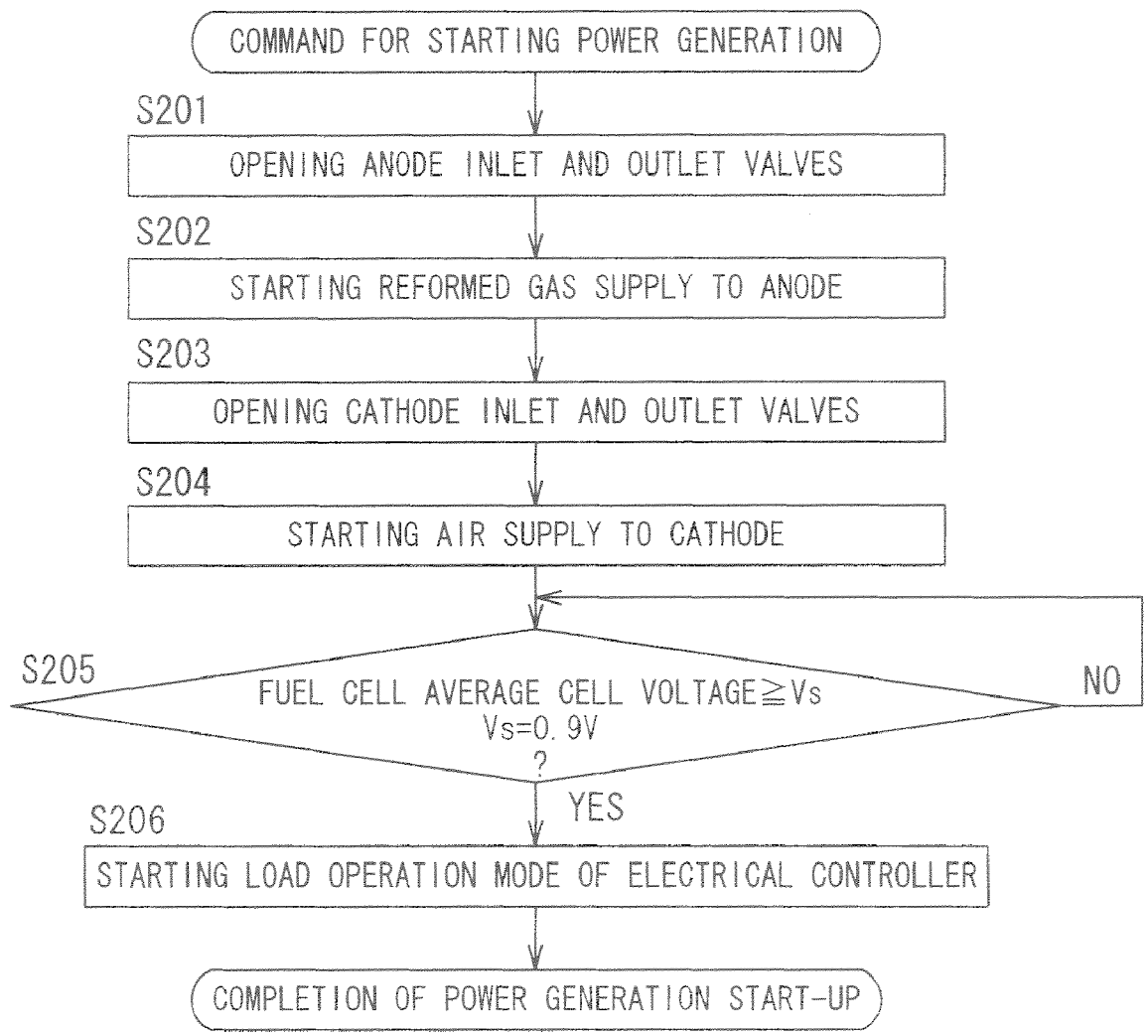
FIG. 3 is a flow chart of a procedure for starting power generation in the method for retaining the suspended state according to the first embodiment.

FIG. 3 is a flow chart of a procedure for starting power generation in the method for retaining the suspended state of the fuel cell power system according to the present invention. As shown in FIG. 3, when a command is issued while the suspended state of the fuel cell power system is retained, the anode inlet valve 15 provided in the fuel supply line 11 and the anode outlet valve 16 provided in the fuel exhaust line 12 are opened (S201), and reformed gas supply to the anode 1a from the reformer 2 is started (S202). Then, the cathode inlet valve 17 provided in the oxidant supply line 13 and the cathode outlet valve 18 provided in the oxidant outlet line 14 are opened (S203), and air supply is started from the air blower 4 to the cathode 1b (S204).

Then, when the electric cell voltage with reference to the anode 1a reaches a preset load operation starting voltage Vs (YES in S205), the electrical controller 3 is switched to the load operation mode and connected to the external load 5, thus starting the power generation (S206). The operation for starting the power generation is thus completed. In the present embodiment, the load operation starting voltage is set, for example, $V_s=0.9$ V. As a result of the starting operation, the fuel cell power system comes into the normal state of generating power.

[Operation]

Figure 4:
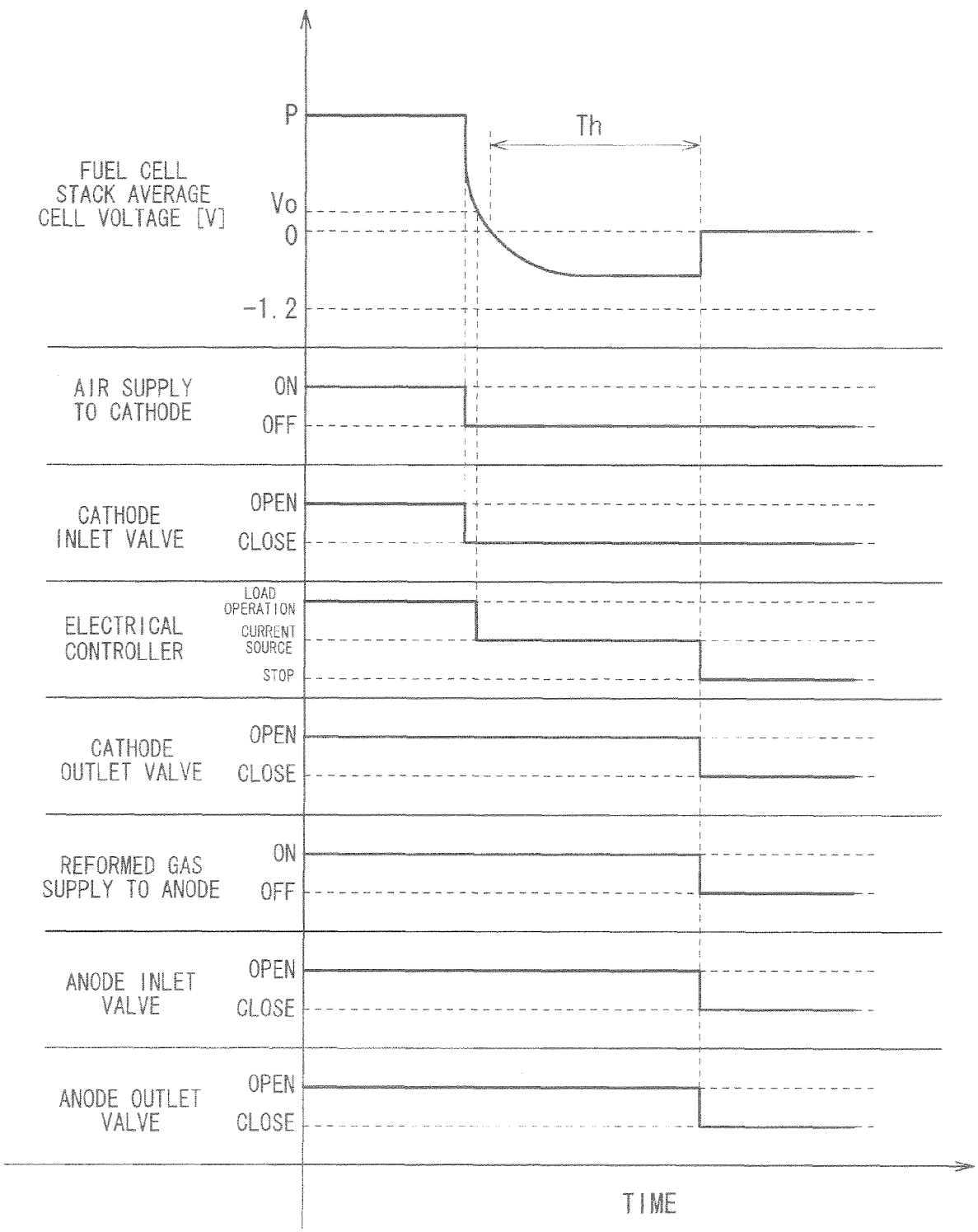
FIG. 4 is a timing chart, of an operation for suspending power generation in the method for retaining the suspended state according to the first embodiment.

FIG. 4 shows a timing chart of an operation for bringing the fuel cell power system into a power generation-suspended state in the method for retaining the suspended state according to the present embodiment, and the timing chart shows the timing of control commands from the system controller 100 to respective components of the system, and the changes with time of the average cell voltage of the fuel cell stack 1. The operation of the method for retaining the suspended state of the fuel cell power system according to the present embodiment will be described hereunder with reference to FIG. 4.

As shown in FIG. 4, if the air supply to the cathode 1a is stopped when the power generation is suspended from the state where the fuel cell stack 1 generates power, that is, from the power generating state where hydrogen-rich reformed gas and air are supplied to the anode 1a and the cathode 1b respectively with power supplied to the external load 5, the oxygen remaining in the cathode 1b is consumed. As a result, the potential of the cathode 1b is reduced to a level close to the hydrogen reference potential, or the potential of the anode 1a, so that the electromotive force of the fuel cell stack 1 is reduced to about 0.1 V.

When the electrical controller 3 is switched from the load operation mode to the current source mode and a direct current is kept flowing from the cathode 1b to the anode 1a through the external circuit in such a state as the fuel cell stack 1 does not have electromotive force, protons produced by oxidization of the hydrogen supplied to the anode 1a transfer to the cathode 1b. Since the protons produce hydrogen by reduction in the cathode 1b, the anode 1a and the cathode 1b are filled with a hydrogen-rich gas.

The average cell voltage of the fuel cell stack 1 at this time is reduced from 0.1 V by a voltage equivalent to an overvoltage. In the present embodiment, the voltage equivalent to the overvoltage is controlled to at least less than 1.2 V, that is, the direct current is controlled so that the average cell voltage with reference to the anode is at least more than −1.2 V. Thus, a reaction occurs different from the reaction of producing hydrogen by electrolysis of water using water as a starting material.

Since in the present embodiment, the amount of reformed gas to be supplied to the anode 1a is set depending on the magnitude of the direct current, corrosion of the catalyst resulting from the deficiency of fuel in the anode 1a can be prevented. Then, the valves 15 to 18 provided at the entrances and exits of the cathode 1b and anode 1a of the fuel cell stack 1 are closed, so that the anode 1a and the cathode 1b are sealed with the hydrogen-rich gas filling them.

Specifically, in the course of bringing the fuel cell power system of the present embodiment into the power generation-suspended state, the hydrogen-rich gas supplied to the anode 1a is electrochemically transferred to the cathode 1b to fill not only the anode 1a, but also the cathode 1b without keeping the anode 1a at a high temperature, unlike the electrolysis of water. Since the filling hydrogen consumes oxygen coming from the outside while the suspended state is retained, the oxygen partial pressures in the anode 1a and the cathode 1b can be prevented from increasing while the suspended state is retained. Letter P shown in FIG. 4 and the subsequent figures represents the pressure of the anode, or the upper limit of the sum of the pressures of the anode and the cathode.

[Advantages]

Figure 5:
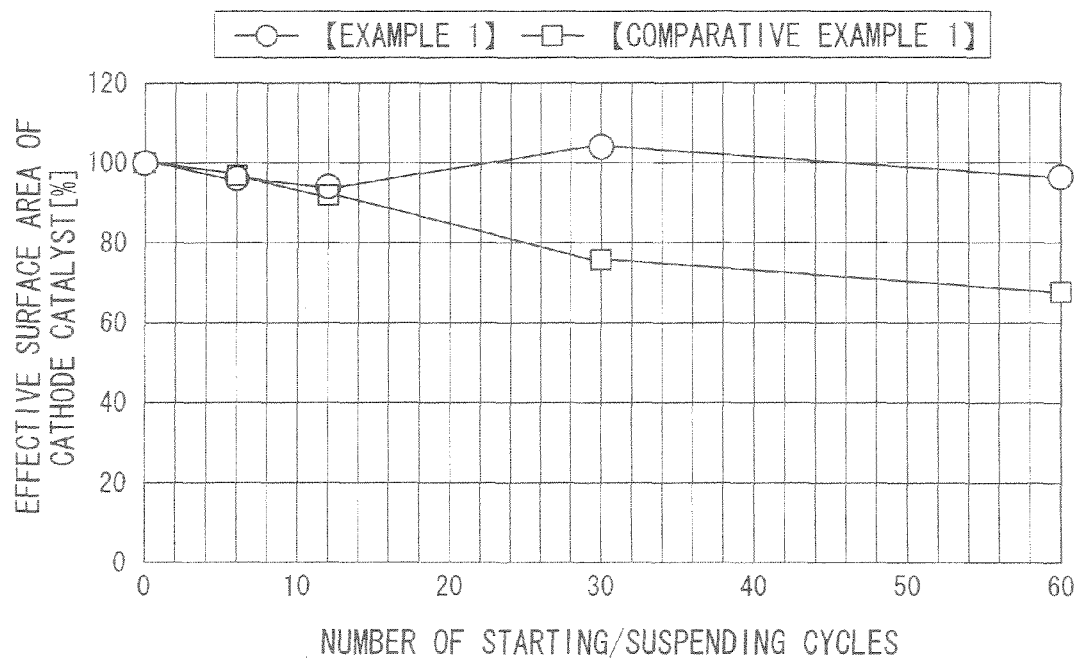
FIG. 5 is a graph showing an effect of the method for retaining the suspended state according to the first embodiment, and representing the relationship between the number of starting/suspending cycles and the effective surface area of the catalyst of the cathode in a cycle test performed on the fuel cell power systems of the first embodiment and a comparative example.
Figure 6:
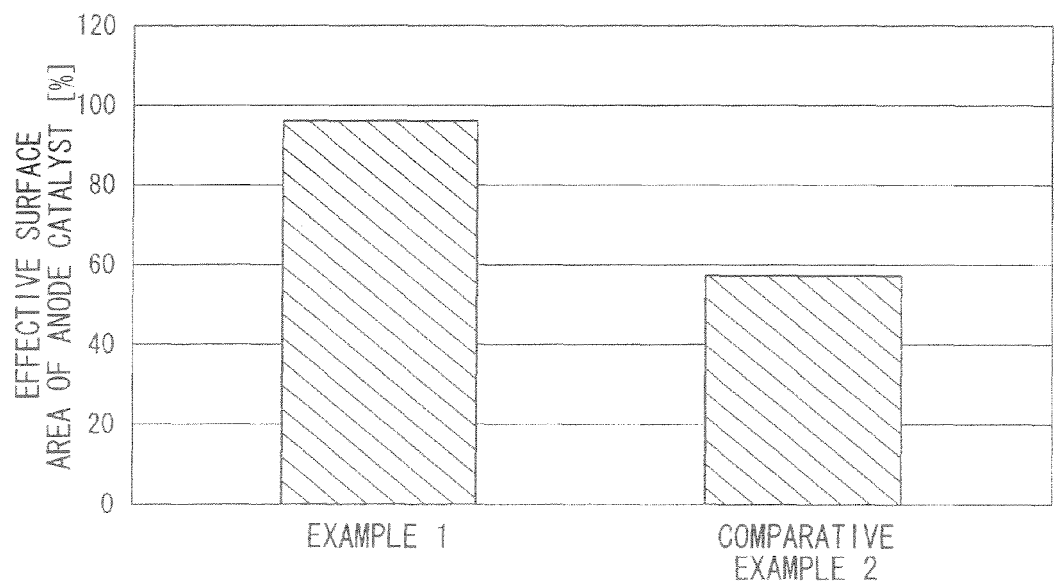
FIG. 6 is a graph showing an effect of the method for retaining the suspended state according to the first embodiment, and representing the ratios of the effective surface areas of the anode catalysts after the cycle test to the initial effective surface areas of the catalysts in the fuel cell power systems of the first embodiment and a comparative example.

FIGS. 5 and 6 show the effects of the method for retaining the suspended state of the fuel cell power system of the present embodiment. The effects of the fuel cell power system of the present embodiment will now be described with reference to these FIGS. 5 and 6.

FIG. 5 shows the relationship between the number of starting/suspending cycles and the effective surface area of the catalyst of the cathode in a cycle test performed on the fuel cell power systems of the present embodiment and comparative example 1. More specifically, FIG. 5 shows the changes (initial value: 100%) in effective surface area of the catalyst of the cathode of each fuel cell stack 1 when the cycle test was performed 60 cycles such that the fuel cell power system generates power for 12 hours and retains the suspended state for 12 hours in one cycle.

FIG. 6 is a graph showing the ratios of the effective surface areas of the anode catalysts after the cycle test to the initial surface areas (100%) of the catalysts in the fuel cell power system of the present embodiment and comparative example 2. In the cycle test, inert gas purge, such as nitrogen purge, was omitted before and after starting or suspending the cell operation.

The fuel cell power systems of comparative examples 1 and 2 shown in FIGS. 5 and 6 had the same structure as the fuel cell power system of the present embodiment shown in FIG. 1, and were operated under the same conditions in the present embodiment except the procedure for suspending power generation mentioned below.

In comparative example 1 shown in FIG. 5, a known suspended state-retaining method was applied to the fuel cell power system. In this method, the valves 15 to 18 provided at the entrances and exits of the anode 1a and cathode 1b were closed to seal the fuel cell stack 1 after the oxygen partial pressure had been sufficiently reduced by nitrogen purge of the cathode 1b after removing the load, and thus the suspended state was retained.

In comparative example 2 shown in FIG. 6, another known suspended state-retaining method was applied to the fuel cell power system. In this method, when the fuel cell power system was brought into the power generation-suspended state, a direct current was applied for 120 seconds to the cathode 1b with the reformed gas supplied to the anode 1a so that the anode 1a was at 1.8 V, and the water remaining in the electrode was electrolyzed to fill the cathode 1b with hydrogen. Then, the valves 15 to 18 provided at the entrances and exits of the anode 1a and cathode 1b were closed to seal the fuel cell stack.

FIG. 5 clearly shows that the present embodiment alleviates the reduction of effective surface area of the catalyst of the cathode resulting from the degradation of the catalyst as shown in comparative example 1. Since the method for retaining the suspended state of the fuel cell power system of the present embodiment thus allows the oxygen coming from the outside with the suspended state retained to be consumed by hydrogen previously filling not only the anode, but also the cathode, the oxygen partial pressure can be prevented from increasing while the suspended state is retained.

Thus, the method of the present embodiment can prevent the sintering of the catalyst, which is caused by the cathode kept at a high potential by increasing the oxygen partial pressure while the suspended state is retained, and the degradation of the catalyst of the cathode, which occurs when the hydrogen-rich gas is supplied for starting the operation with oxygen present in both electrodes. Thus, the reduction of the effective surface area of the catalyst can be prevented, and the reduction of the fuel cell stack voltage resulting from the reduction of the effective surface area of the catalyst can be prevented.

FIG. 6 clearly shows that the present embodiment alleviates the reduction of effective surface area of the catalyst of the anode resulting from the degradation of the catalyst. Hence, the method for retaining the suspended state of the fuel cell power system of the present embodiment can prevent the sintering of the anode caused at high potential, by electrochemically transferring the hydrogen-rich gas supplied to the anode to the cathode to fill the cathode with hydrogen without keeping the anode at a high potential, unlike electrolysis of water. This method is particularly effective in a system in which a measure against CO poisoning is taken.

[First Modification 1]
[Structure]

In the first modification 1 of the first embodiment to which the present invention is applied, the fuel cell power system has the same structure (FIG. 1) as that in the first embodiment and only the method for retaining the suspended state is modified.

[Procedures for Suspending and Starting Power Generation]

Figure 7:
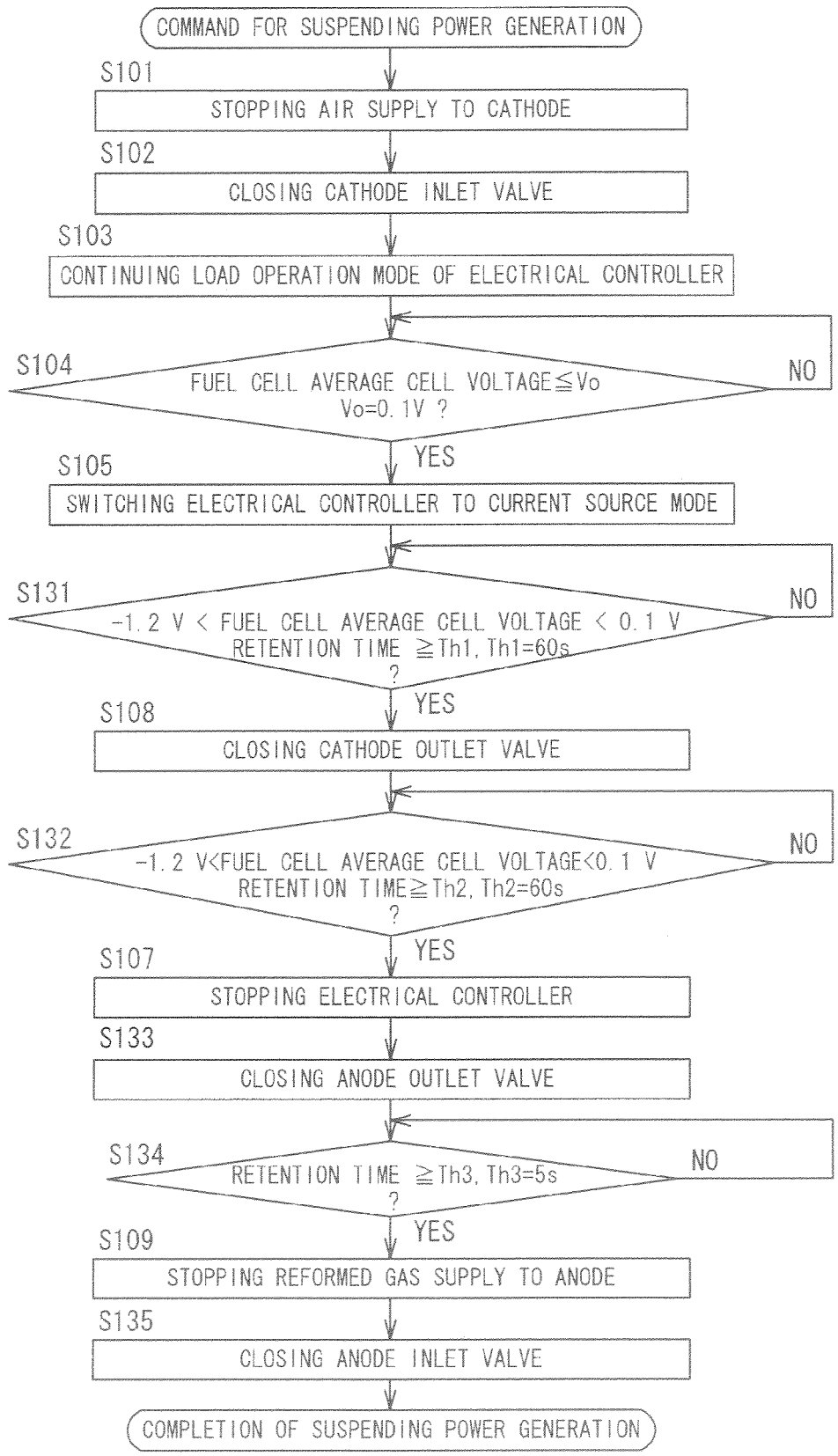
FIG. 7 is a flow chart of a procedure for bringing a fuel cell power system into a power generation-suspended state in the method for retaining the suspended state of the fuel cell power system according to a modification of the first embodiment to which the method of the present invention is applicable.

FIG. 7 is a flow chart of a procedure for suspending power generation in the method for retaining the suspended state of the present modification. As shown in FIG. 7, the procedure for suspending power generation of the modification is performed by partly altering the procedure for suspending power generation of the first embodiment shown in FIG. 2.

More specifically, in the present first modification, a series of steps (S101 to S105) is performed in the same manner as in the procedure for suspending the power generation of the first embodiment. In this method, when a command for the suspending power generation is issued while the fuel cell power system generates power, air supply to the cathode 1b is stopped and the cathode inlet valve 17 is closed. Then, the electrical controller 3 is kept in the load operation mode, and the electrical controller 3 is switched to the current source mode to pass a direct current to the anode 1a at the point when the electric cell voltage with reference to the anode 1a is reduced to 0.1 V.

The procedure for suspending the power generation according to the present modification is different from the procedure of the first embodiment in that the cathode outlet valve 18 of the oxidant exhaust line 14 is closed while the current source mode is continued. More specifically, the cathode outlet valve 18 is closed (S108) at the point when a preset first retention time Th1 elapses (YES in S131) after the electric cell voltage with reference to the anode 1a is reduced to a level of more than −1.2 V to less than 0.1 V. Then, the current source mode is further continued and the electrical controller 3 is stopped (S107) at the point when a preset second retention time Th2 elapses (Yes in S132). In the present modification, for example, the first retention time Th1 and the second retention time Th2 are each set at 60 seconds.

The procedure for suspending the power generation according to the present modification is also different from the procedure of the first embodiment in that the anode outlet valve 16 is first closed (S133) after the electrical controller 3 is stopped, and the reformed gas supply to the anode 1a is stopped (S109) and the anode inlet valve 15 is closed (S135) at the point when a preset third retention time Th3 elapses (YES in S134). In this instance, for example, the third retention time Th3 is set at 5 seconds.

The procedure for starting power generation of the present modification is the same as in the first embodiment and is performed according to the procedure shown in FIG. 3.

[Operation]

Figure 8:
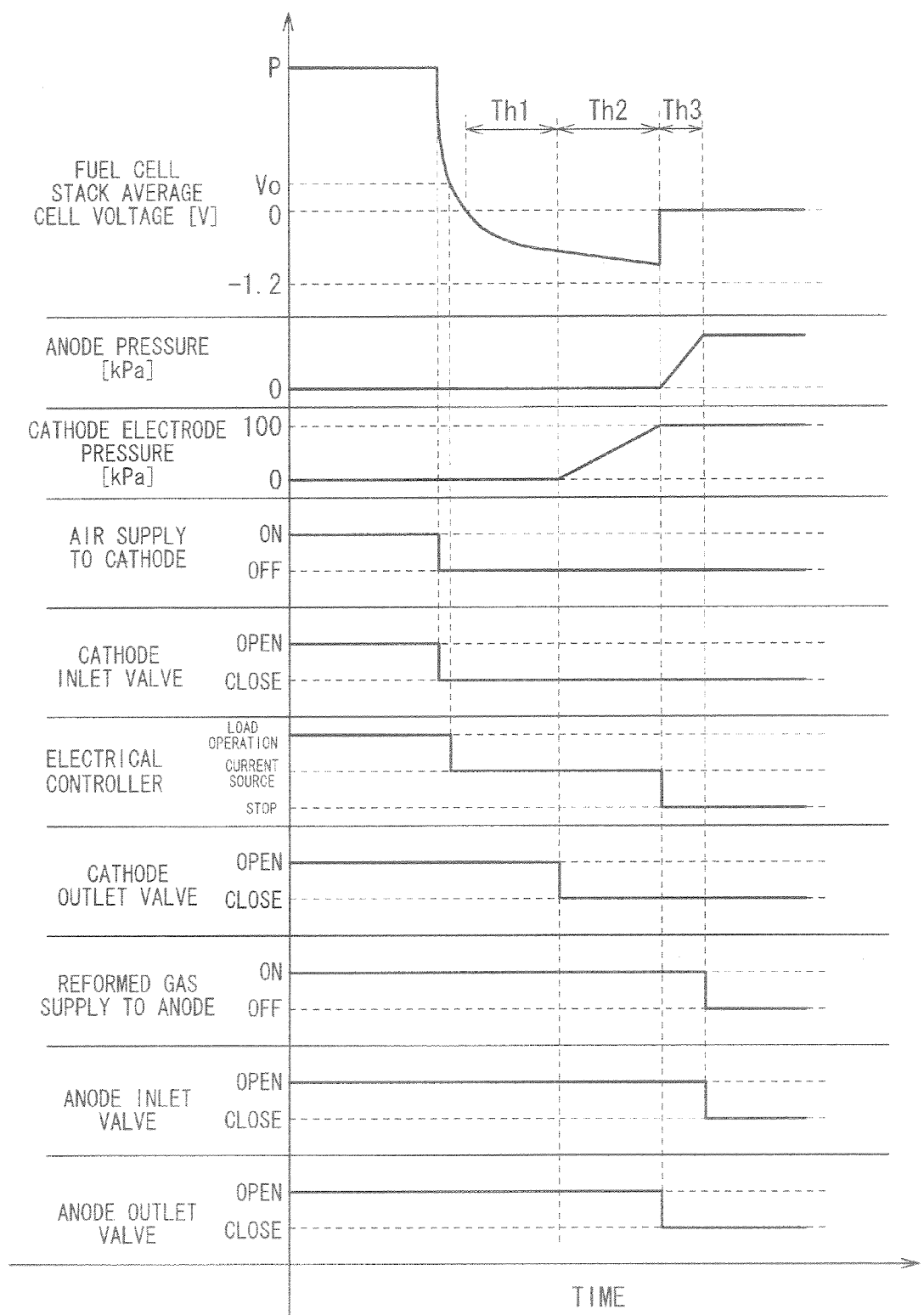
FIG. 8 is a timing chart of an operation for suspending power generation in the method for retaining the suspended state according to the modification.

FIG. 8 is a timing chart of an operation for bringing the fuel cell power system into the power generation-suspended state in the method for retaining the suspended state according to the present modification, and specifically shows the timing of control commands from the CPU 101 of the system controller 100 to the respective system components through the input/output portion 103, the changes with time of the average cell voltage of the fuel cell stack 1 besides the changes with time of the anode voltage and cathode voltage. Operations and functions due to the method for retaining the suspended stated of the fuel cell power system according the present embodiment will be explained hereunder with reference to FIG. 8.

FIG. 8 shows that in the operation for suspending the power generation in the present modification, the electrical controller 3 is kept in the current source mode to pass a current, using the external power supply 200 as power source, and hydrogen is thus continuously transferred to the cathode 1b to increase the pressure of the cathode 1b gradually. As for the anode 1a, its pressure is increased by stopping the reformed gas supply and closing the anode inlet valve 15 after the anode outlet valve 16 is closed. Thus, on the completion of the operation for suspending power generation of the fuel cell stack 1, the anode 1a and the cathode 1b are sealed with being pressurized by hydrogen-rich gas.

[Advantages]

In the present modification as described above, by previously sealing the fuel cell stack with the inside pressurized, a negative pressure produced by volume reduction resulting from steam condensation can be prevented even if the temperature of the fuel cell stack is reduced, and air can be prevented from coming into the fuel cell stack from the outside.

The first modification 1 can prevent the increase of the oxygen partial pressure inside the electrodes of the fuel cell effectively. Accordingly, it can prevent more effectively the sintering of the catalyst, which is caused by the cathode kept at a high potential by increasing the oxygen partial pressure while the suspended state is retained, and the degradation of the catalyst of the cathode, which occurs when the hydrogen-rich gas is supplied for starting the operation with oxygen present in both electrodes. Thus, the reduction of the fuel cell stack voltage resulting from the reduction of the effective surface area of the catalyst of the cathode can be prevented more effectively.

[Second Modification 2]
[Structure]

In the second modification 2 further modified from the first embodiment and first modification 1, the fuel cell power system has the same structure (FIG. 1) as the structures thereof and only the method for retaining the suspended state is modified.

[Procedures for Suspending and Starting Power Generation]

Figure 9:
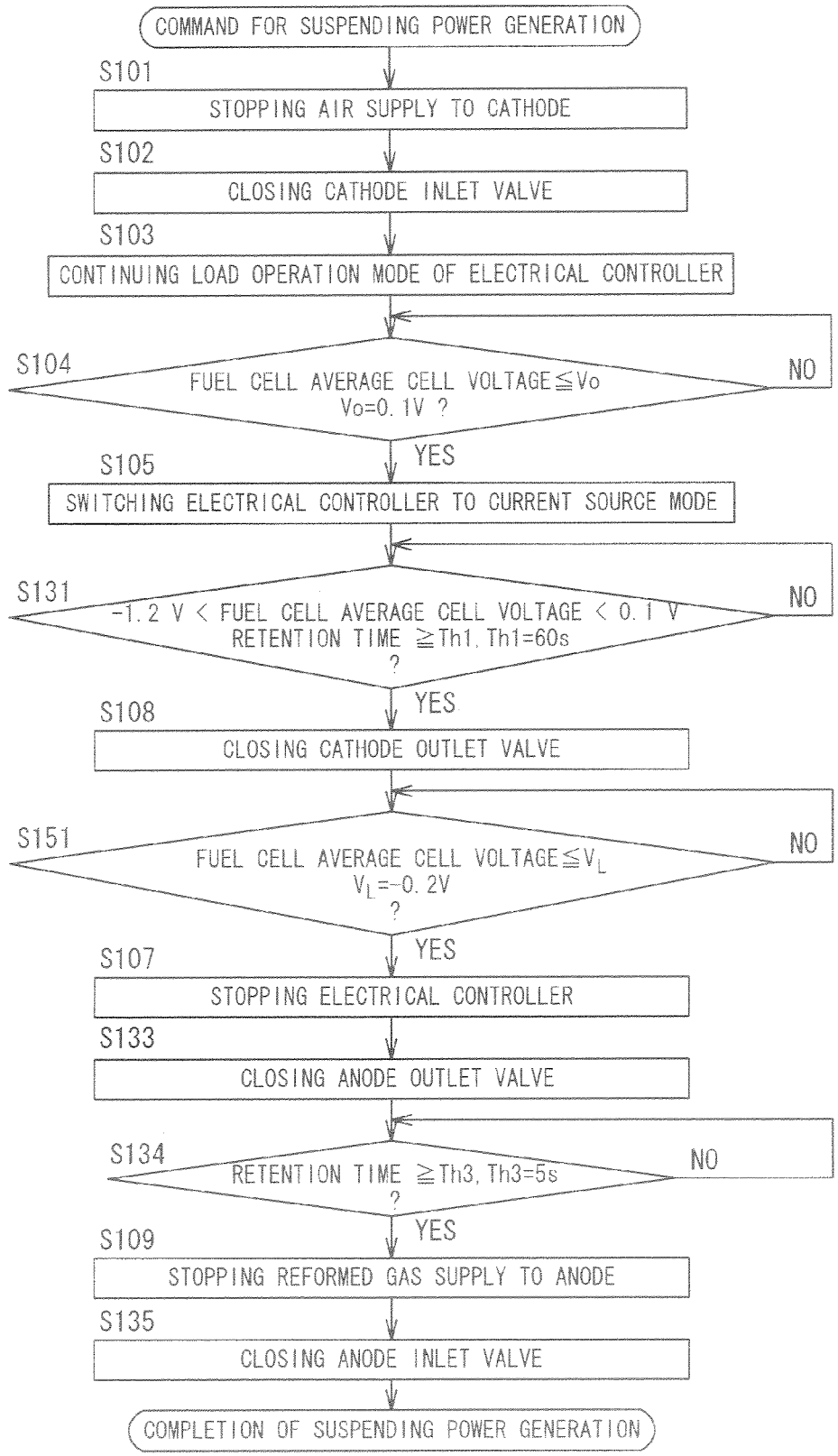
FIG. 9 is a flow chart of a procedure for bringing the fuel cell power system into a power generation-suspended state in a method for retaining the suspended state according to the first embodiment and another modification of the first embodiment.

FIG. 9 is a flow chart of a procedure for suspending the power generation in the method for retaining the suspended state of modification 2. As shown in FIG. 9, the procedure for suspending the power generation of the second modification 2 is performed by partly altering the procedure for suspending the power generation of the first modification 1 shown in FIG. 7, and is different in only the criteria for stopping the electrical controller 3 after the cathode outlet valve 18 is closed (S108) with the current source mode continued.

While the first modification 1 determines whether a preset second retention time Th2 has elapsed or not (S132), the second modification 2 determines whether or not the electric cell voltage with reference to the anode 1a has reduced to a preset lower limit voltage VL (S151) and stops the electrical controller 3 (S107) at the point when the voltage is reduced to the lower limit voltage VL (YES in S151). In this instance, for example, the lower limit voltage VL is set at −0.2 V.

Other steps in the procedure for suspending the power generation of this second embodiment 2 are the same as in the procedure for suspending the power generation of the first modification 1. The procedure for starting the power generation of the second modification 2 is the same as in the first embodiment and the first modification 1 and is performed according to the procedure shown in FIG. 3.

[Operation and Advantages]

Figure 10:
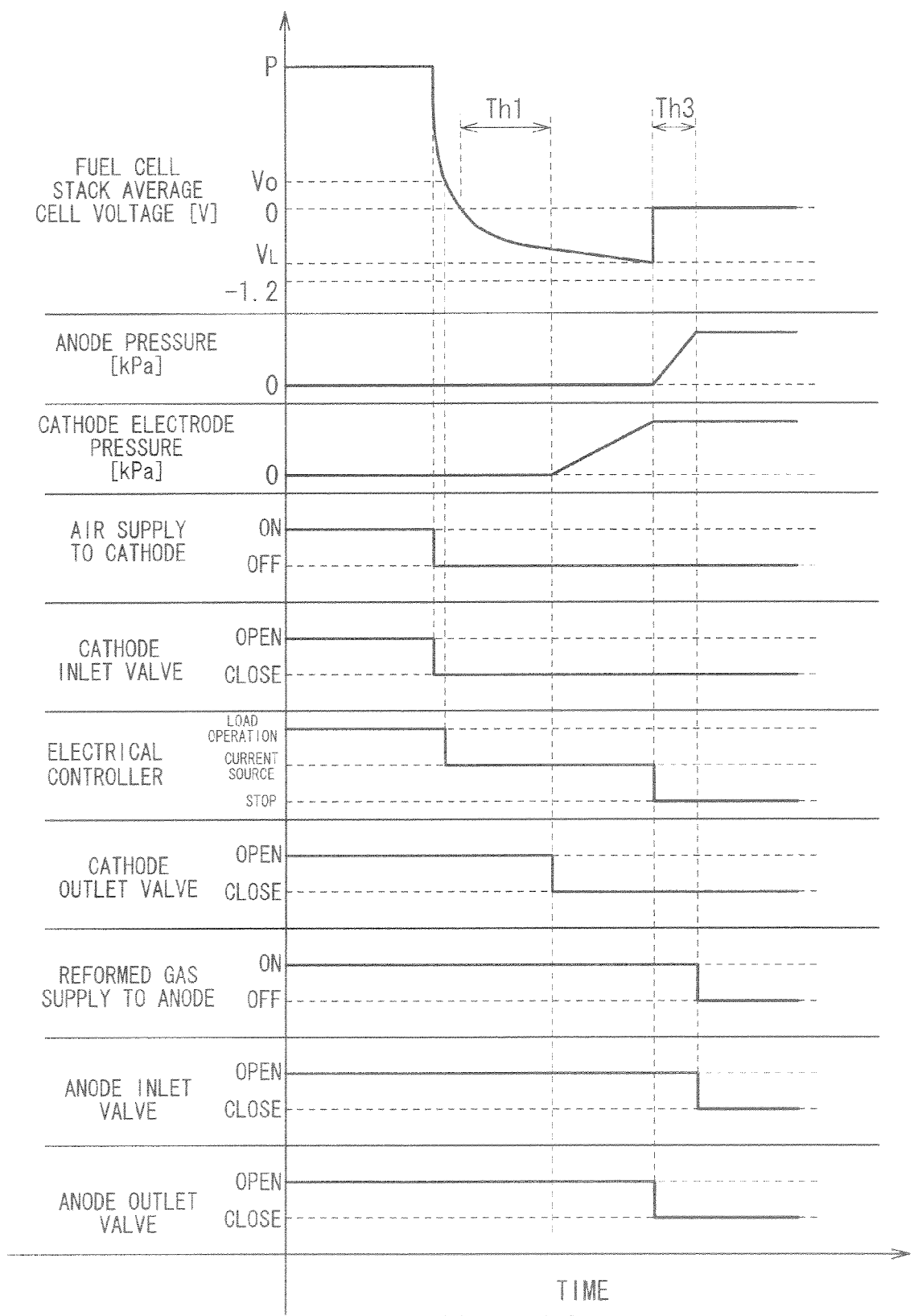
FIG. 10 is a flow chart of a procedure for suspending power generation in the method according to the latter modification.

FIG. 10 is a timing chart of a procedure for bringing the fuel cell power system into a power generation-suspended state in the method for retaining the suspended state according to the second modification 2, and specifically shows the timing of control commands from the CPU 101 of the system controller 100 to the respective system components through the input/output portion 103, the changes with time of the average call voltage of the fuel cell stack 1 besides the changes with time of the anode voltage and cathode voltage.

FIG. 10 clearly shows that the method for retaining the suspended state according to this second modification 2 can produce the same effect as that of the first modification 1. In addition, the pressure of the cathode can be detected by monitoring the average cell voltage of the fuel cell stack, and accordingly, the pressure can be easily controlled as in a third embodiment described hereinafter. Thus, the method according to the second modification 2 is particularly effective in the case where the upper limit of the internal pressure of the fuel cell is low. The second modification 2 can omit the pressure gage unlike the third embodiment. Accordingly, the second modification 2 allows system components to be simplified.

[Second Embodiment]
[Structure]

Figure 11:
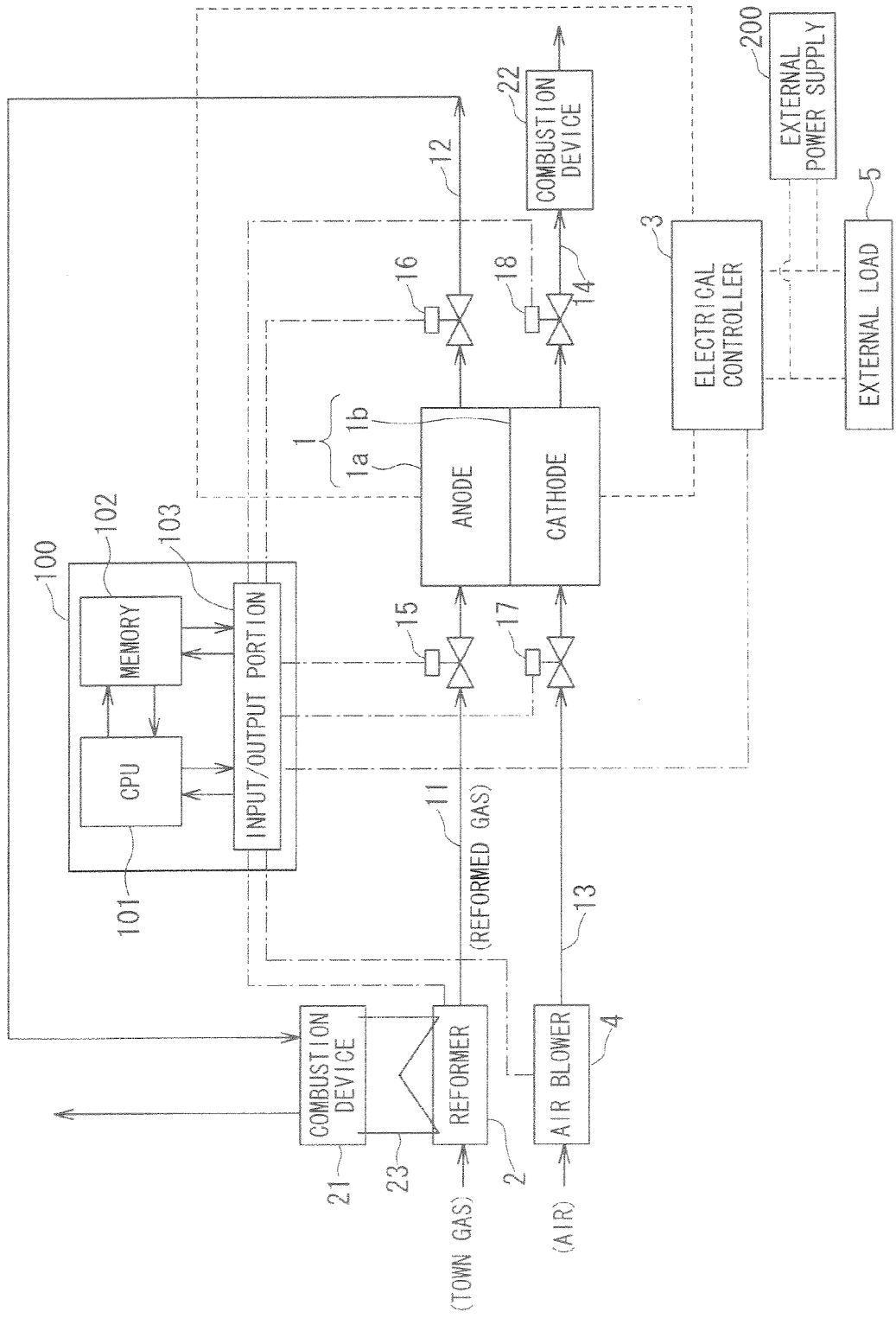
FIG. 11 is a block diagram of a fuel cell power system according to a second embodiment to which the present invention is applicable.

FIG. 11 is a block diagram of a fuel cell power system according to a second embodiment to which the present invention is applied. As shown in FIG. 11, the fuel cell power system of the present second embodiment has combustion devices 21 and 22 in such a manner that they are provided to the structure of the first embodiment, downstream from the anode outlet valve 16 in the fuel exhaust line 12 and the cathode outlet valve 18 in the oxidant exhaust line 14 respectively. A heat exchanger 23 is also provided which uses heat generated from the combustion device 21 to keep the temperature of the reformer 2.

More specifically, unreacted hydrogen exhausted from the anode 1a and air adjusted for combustion are supplied to the combustion device 21 provided in the fuel exhaust line 12. Heat generated by the combustion in the combustion device 21 is used by the heat exchanger 23 as a heat source for keeping the temperature of the reformer 2. An oxidation catalyst that has been brought into contact with air is disposed in the combustion device 22 provided in the oxidant exhaust line 14 so that combustible gas is not exhausted to the outside of the system even if hydrogen-rich gas is exhausted from the cathode 1b.

In addition to the same function as that of the electrical controller 3 in the first embodiment of switching the normal load operation mode and the current source mode according to a command from the system controller, the electrical controller 3 has the function of controlling the direct current value according to the temperature of the reformer 2. The other components are the same as those in the fuel cell power system according to the first embodiment and the description will be omitted herein.

[Procedures for Suspending and Starting Power Generation]

The procedures for suspending and starting the power generation of a fuel cell power system according to the present second embodiment is the same as those in the first embodiment and are conducted as shown in FIGS. 2 and 3.

[Operation and Advantages]

The fuel cell power system of the present embodiment operates as follows and produces the following effects.

While the fuel cell power system of the present embodiment is brought into a power generation-suspended state, fuel exhaust gas exhausted from the anode 1*a* is returned to the combustion device 21 to burn hydrogen gas remaining in the fuel exhaust gas. Heat generated by this burning is used as a heat source for the reformer 2. If the amount of the remaining hydrogen is high, heat generated by the combustion device 21 is increased to increase the temperature of the reformer 2.

When the electrical controller 3 is in the load operation mode, the increase in direct current increases the consumption of the hydrogen in the anode 1*a* to reduce the amount of remaining hydrogen. When the electrical controller 3 is in the current source mode, the increase in direct current increases the amount of hydrogen transferred to the cathode 1*b* to reduce the amount of remaining hydrogen as well. The hydrogen remaining in the fuel exhaust gas is thus reduced by increasing the direct current. Accordingly, when the temperature of the reformer 2 is high, it can be reduced by increasing the direct current to reduce the hydrogen remaining in the fuel exhaust gas and thus to reduce heat generated from the combustion device 21.

Thus, the present embodiment can control the temperature of the reformer in an appropriate range to prevent the degradation of the reformer, as well as producing the same effect as that of the first embodiment.

After the electrical controller 3 is turned into the current source mode using the external power supply 200 as a power source, hydrogen is transferred to the cathode 1*b*. If this operation is continued, the hydrogen content in the exhaust gas from the cathode 1*b* is gradually increased. Since in the present embodiment, another combustion device 22 is provided at the exit of the cathode, the hydrogen gas can be burned in the combustion device 22 that has been in contact with air to reduce the hydrogen content in the exhaust gas to a level less than the explosive limit. Thus, the present embodiment is superior in safety.

[Third Embodiment]
[Structure]

Figure 12:
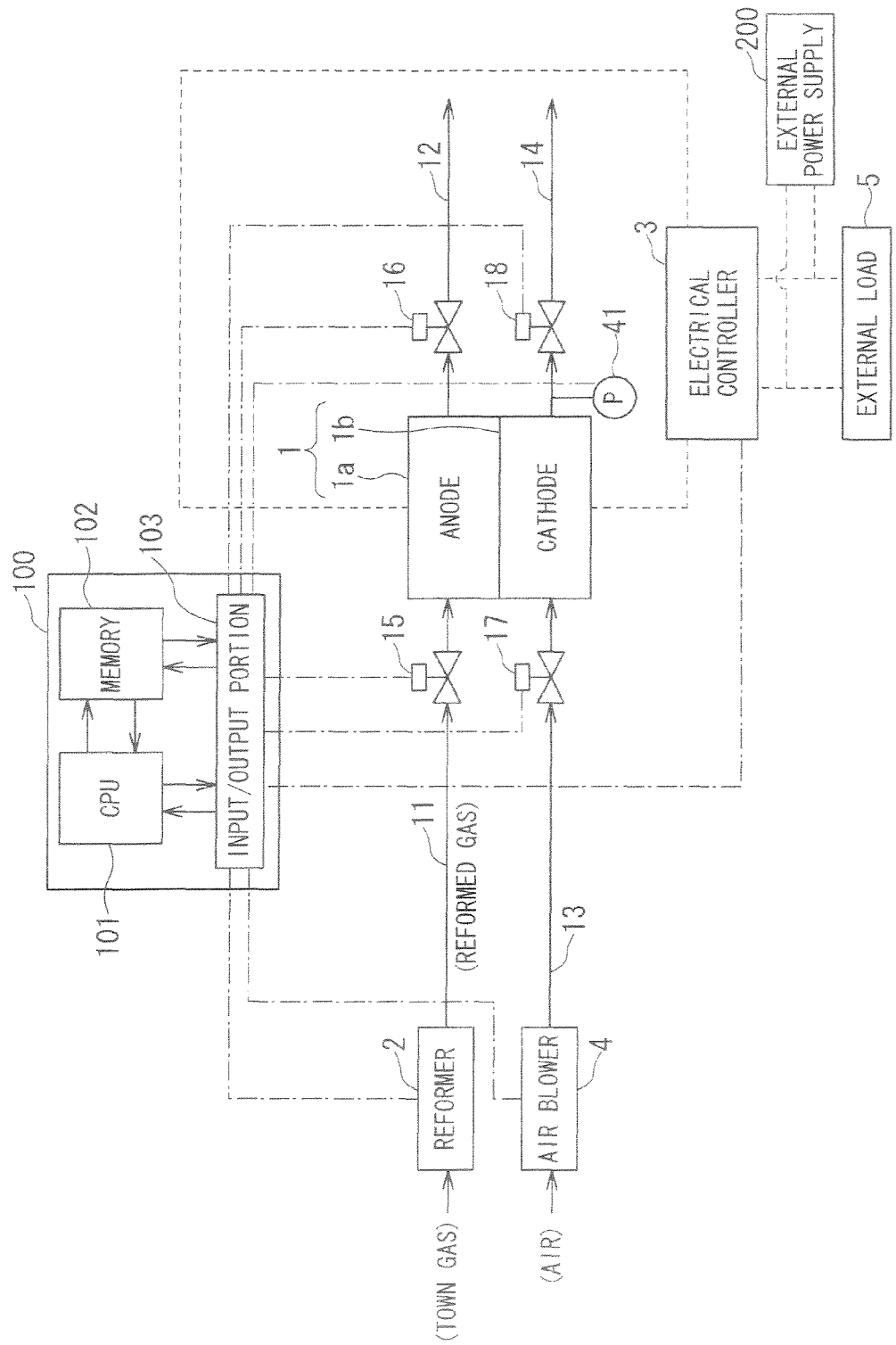
FIG. 12 is a block diagram of a fuel cell power system according to a third embodiment to which the present invention is applicable.

FIG. 12 is a block diagram of a fuel cell power system according to a third embodiment to which the present invention is applied. As shown in FIG. 12, the fuel cell power system of the present embodiment has a pressure gauge 41 for measuring the pressure of the cathode 1*b* in such a manner that it is provided to the structure of the first embodiment or the first modification 1 of the first embodiment, upstream from the cathode outlet valve 18 in the oxidant exhaust line 14. The other components are the same as in the fuel cell power system of the first embodiment or the first modification 1 of the first embodiment, and the description will be omitted.

[Procedures for Suspending and Starting Power Generation]

Figure 13:
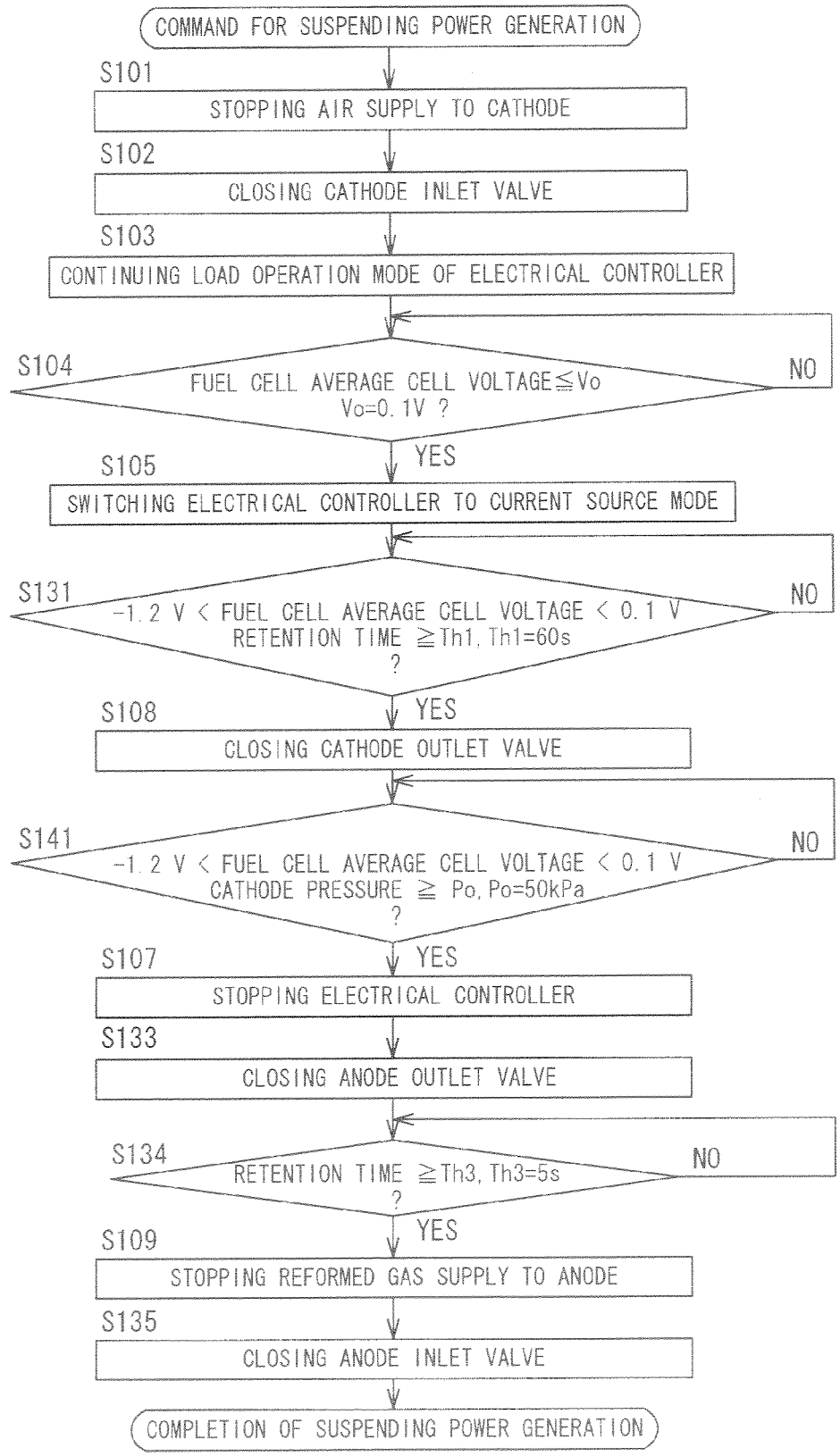
FIG. 13 is a flow chart of a procedure for suspending power generation in a method for retaining a suspended state according to the third embodiment.

FIG. 13 is a flow chart of a procedure for bringing the fuel cell power system into a power generation-suspended state in the method for retaining the suspended state according to the present embodiment. As shown in FIG. 13, the procedure for suspending the power generation of the present embodiment is performed by partly altering the procedure for suspending the power generation of the first modification 1 of the first embodiment shown in FIG. 7, and is different only in the criteria for stopping the electrical controller 3 after the cathode outlet valve 18 is closed (S108) with the current source mode continued.

More specifically, while the first modification 1 determines whether or not a preset second retention time Th2 has elapsed or not (S132), the present embodiment determines whether or not the pressure of the cathode 1*b* measured with the pressure gauge 41 reaches a preset pressure Po (S141) and stops the electrical controller 3 (S107) at the point when the pressure reaches the preset pressure Po (YES in S141). In this instance, for example, the preset pressure Po is 50 kPa.

Other steps in the procedure for suspending power generation are the same as in the procedure for suspending power generation of modification 1 of the first embodiment. The procedure for starting power generation is the same as in the first embodiment and modification 1 of the first embodiment and is performed according to the procedure shown in FIG. 3.

[Operation and Advantages]

Figure 14:
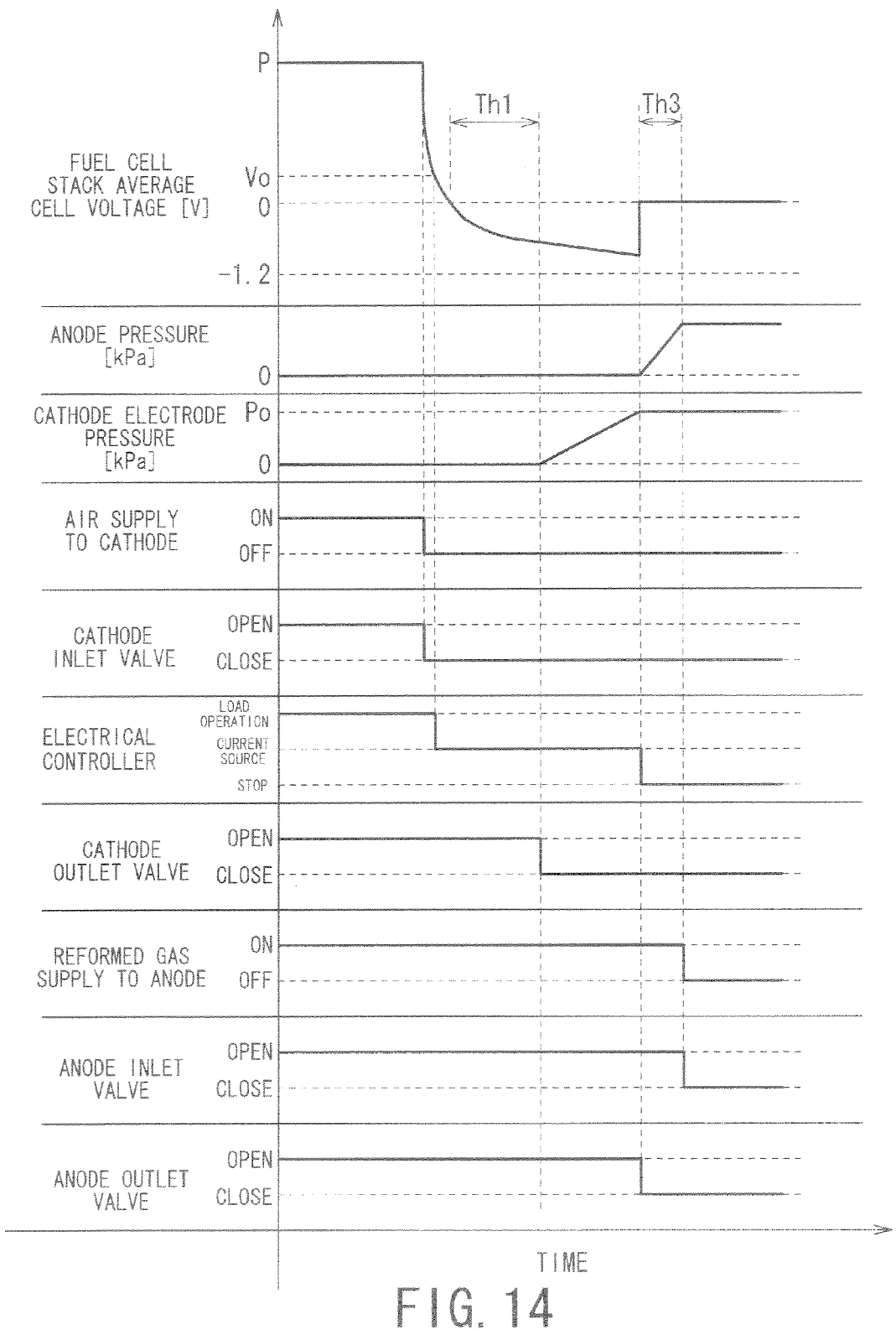
FIG. 14 is a timing chart of an operation for suspending power generation in the method for retaining the suspended state according to the third embodiment.

FIG. 14 is a timing chart of an operation for bringing the fuel cell power system into a power generation-suspended state in the method for retaining the suspended state according to the present embodiment, and specifically shows the timing of control commands from the CPU 101 of the system controller 100 to the respective components through the input/output portion 103, the changes with time of the average cell voltage of the fuel cell stack 1 besides the changes with time of the pressures of the anode and the cathode.

FIG. 14 clearly shows that the method for retaining the suspended state according to the present embodiment can produce the same effect as that of the first modification 1. In addition, since the pressure of the cathode is directly monitored, the pressure can easily be controlled. Thus the method according to the present third embodiment is particularly effective in the case where the upper limit of the internal pressure of the fuel cell is low.

[Fourth Embodiment]
[Structure]

Figure 15:
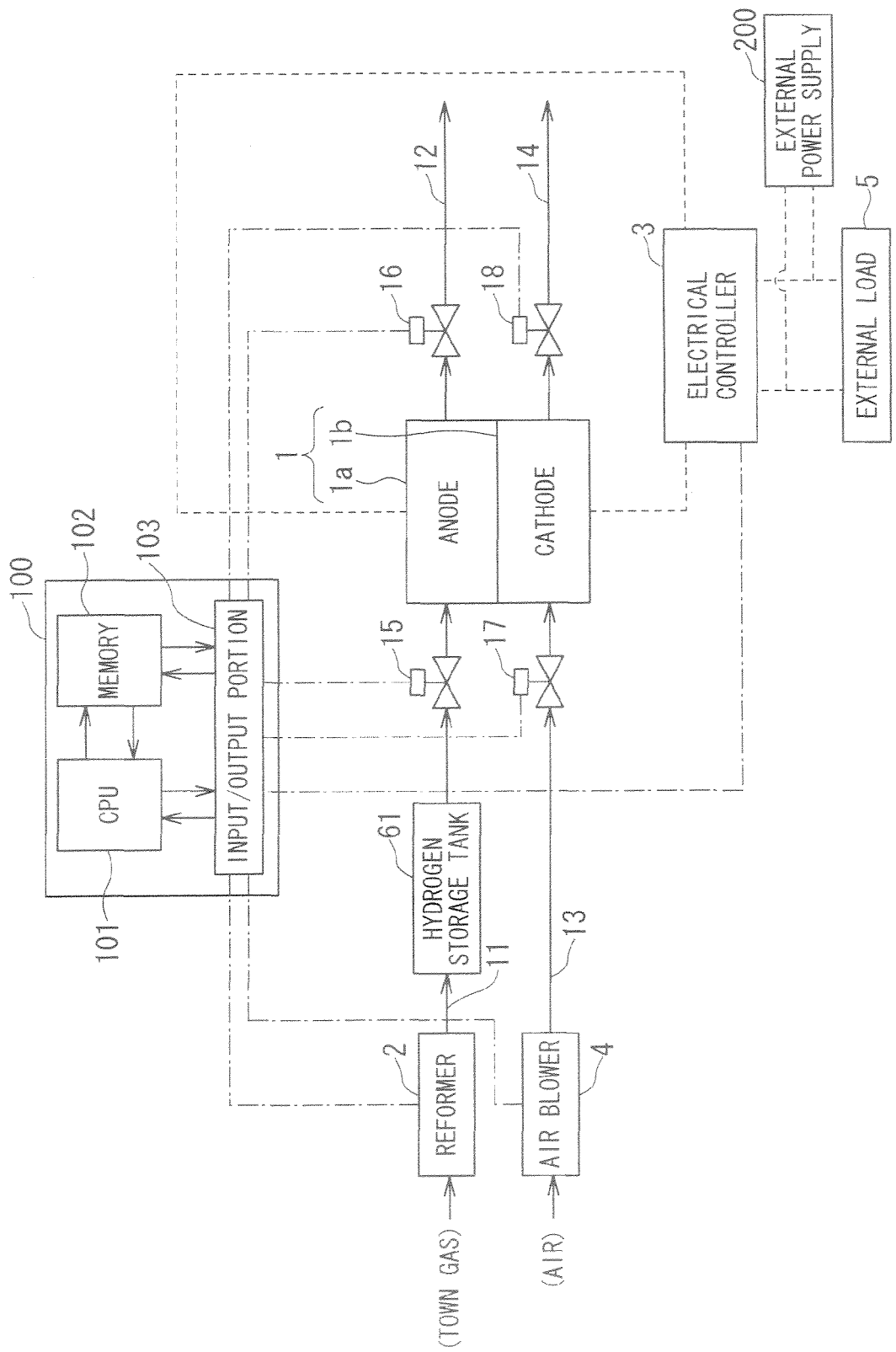
FIG. 15 is a block diagram of a fuel cell power system according to a fourth embodiment to which the present invention is applicable.

FIG. 15 is a block diagram of a fuel cell power system according to a fourth embodiment to which the present invention is applied. As shown in FIG. 15, the fuel cell power system of the present embodiment has a hydrogen storage tank 61 in such a manner that it is provided to the structure of the first embodiment, upstream from the anode inlet valve 15 in the fuel supply line 11. The other components are the same as those in the fuel cell power system of the first embodiment, and the description will be omitted herein.

[Procedures for Suspending and Starting Power Generation]

The procedures for suspending and starting the power generation in the present embodiment are the same as in the first embodiment and are performed according to the procedures shown in FIGS. 2 and 3, respectively.

[Procedure for Supplying Hydrogen During Retaining Suspended State]

Figure 16:
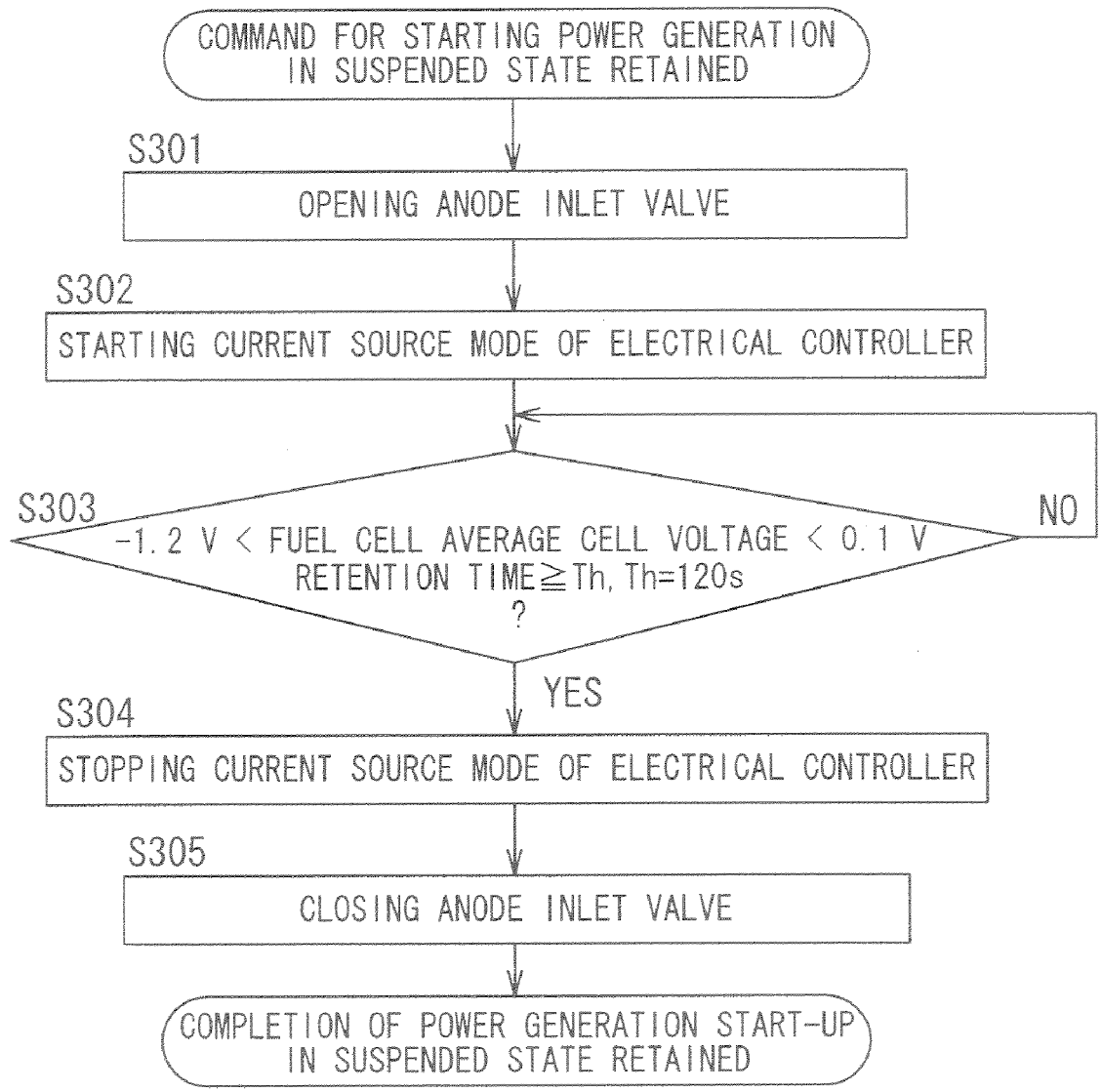
FIG. 16 is a flow chart of a procedure for supplying hydrogen while the suspended state is retained in the method for retaining the suspended state according to the fourth embodiment.

FIG. 16 is a flow chart of a procedure for supplying the hydrogen while the fuel cell power system retains the suspended state in the method for retaining the suspended state. As shown in FIG. 16, when a command for supplying the hydrogen is issued while the fuel cell power system retains the suspended state, the anode inlet valve 15 is opened to start the hydrogen supply from a hydrogen storage tank 61 to the anode 1*a* (S301), and then, the operation mode of the electrical controller 3 is set in the current source mode to start the applying of a direct current from the cathode to the anode through an external circuit (S302).

After the electric cell voltage (average cell voltage of the fuel cell stack 1) with reference to the anode 1*a* is reduced to a level of more than −1.2 V to less than 0.1 V with the current source mode continued and at the point when a retention time Th (=120 s) elapses (YES in S303), the electrical controller 3 is stopped (S304) and the anode inlet valve 15 (S304) is closed. Thus, a sequence of the hydrogen supply is completed.

In practice, while the fuel cell power system retains the suspended state, the sequence of the hydrogen supply is performed at predetermined time intervals, for example, every 12 hours,

[Operation]

The present embodiment operates as below. Both the anode 1a and the cathode 1b are filled with hydrogen-rich gas after the completion of the sequence of the operation for suspending the power generation, and the hydrogen partial pressures are gradually reduced. In the present embodiment, the anode inlet valve 15 is opened every 12 hours to supply the hydrogen by pressurizing from the hydrogen storage tank 61 to the anode 1b. In addition, the hydrogen is transferred to the cathode 1b by applying a direct current from the cathode 1b to the anode 1a through an external circuit when the average cell voltage of the fuel cell stack 1 is less than 0.1 V. Hence, the operation of the hydrogen supply can increase the hydrogen partial pressures in both the anode 1a and the cathode 1b while the suspended state is retained.

[Advantages]

As described above, in the present embodiment, the sequence of the hydrogen supply is performed at regular intervals so that the hydrogen partial pressure, which is reduced by hydrogen consumption by contaminated oxygen, can be increased while the suspended state is retained. Thus, a sufficient amount of hydrogen, which consumes oxygen, can be ensured even if oxygen is continuously mixed. Consequently the present embodiment can prevent the increase in oxygen partial pressure effectively.

Since the increase of the oxygen partial pressure inside the fuel cell electrode can be prevented effectively, the method of the present embodiment can prevent the sintering of the catalyst, which is caused by the cathode kept at a high potential by increasing the oxygen partial pressure while the suspended state is retained, and the degradation of the catalyst of the cathode, which occurs when the hydrogen-rich gas is supplied for starting the operation with oxygen present in both electrodes. Thus, the reduction of the effective surface area of the catalyst can be prevented more effectively, and the reduction of the fuel cell stack voltage resulting from the reduction of the effective surface area of the catalyst can be prevented more effectively.

[Fifth Embodiment]

Figure 17:
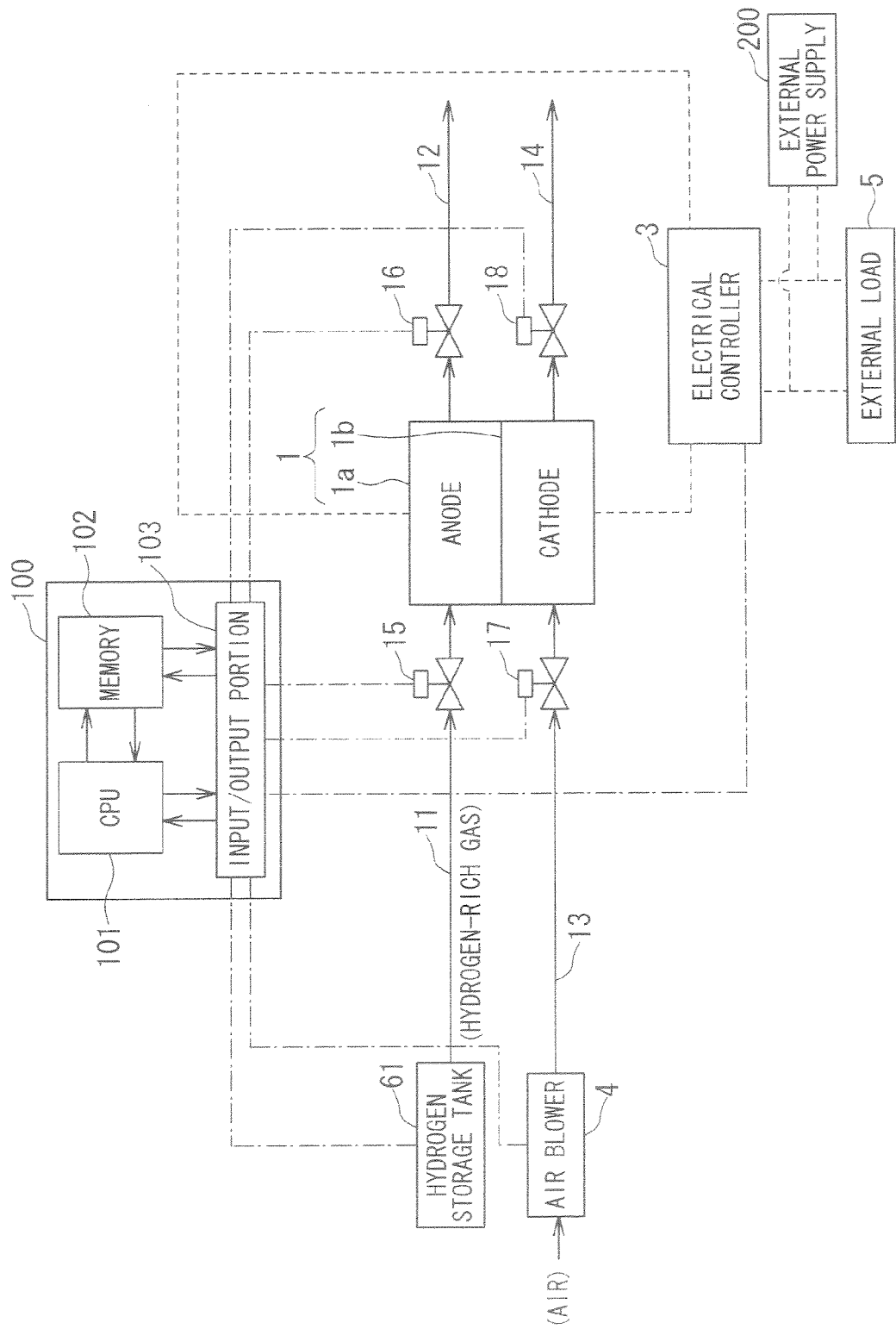
FIG. 17 is a block diagram of a fuel cell power system according to a fifth embodiment of the present invention.

While the fourth embodiment explains the fuel cell power system including the reformer 2, a system structure having the hydrogen storage tank 61 without using the reformer 2 may be made, as shown in FIG. 17. This structure of this fifth embodiment can produce the same effect as that of the fourth embodiment. The other components are the same as in the fourth embodiment and the description will be omitted herein.

[Other Embodiments]

The present invention is not limited to the above-described embodiments and various modifications may be made without departing from the scope of the invention. For example, the retention time used in the procedure for suspending the power generation is no more than an example, and may be changed as appropriate. In other words, the present invention may be modified in the system structure or the procedure for suspending the power generation as appropriate, as long as a direct current is applied from the cathode to the anode through an external circuit after closing the oxidant supply line, until the electric cell voltage with reference to the anode comes to a level more than −1.2 V to less than 0.1 V, in the course of bringing the fuel cell power system into a power generation-suspended state. Such modifications can produce satisfying effects as well.

The invention claimed is:

1. A method for retaining a power generation-suspended state of a fuel cell power system in a process of bringing the fuel cell power system into the power generation-suspended state and retaining the power generation-suspended state, the fuel cell power system including a fuel cell stack prepared by stacking a plurality of electric cells, each having an anode and a cathode with an electrolyte therebetween, a fuel supply line and an oxidant supply line that respectively supply a fuel and an oxidant to the fuel cell stack, and a fuel exhaust line and an oxidant exhaust line that respectively exhaust the fuel and oxidant supplied to the fuel cell stack, the method comprising the steps of:

closing the oxidant supply line in the course of bringing the fuel cell power system into the power generation-suspended state;

applying a direct current from the cathode to the anode through an external circuit with the oxidant supply line closed by the step of closing the oxidant supply line until the electric cell voltage with reference to the anode comes to a level of more than −1.2 V to less than 0.1 V;

closing the oxidant exhaust line during the step of applying a direct current; and closing the fuel exhaust line and the fuel supply line after a termination point of the step of applying a direct current.

2. The method for retaining the suspended state of the fuel cell power system according to claim 1, wherein an inside of the fuel cell stack is pressured by closing the oxidant exhaust line.

3. The method for retaining the suspended state of the fuel cell power system according to claim 1, wherein the step of closing the oxidant exhaust line is performed after starting the step of applying a direct current, and the step of applying a direct current is terminated with step of closing the fuel exhaust and fuel supply lines after the step of closing the oxidant exhaust line.

4. The method for retaining the suspended state of the fuel cell power system according to claim 3, wherein after the step of closing the oxidant exhaust line, pressure of the cathode is monitored and the step of applying a direct current is terminated with the step of closing the fuel exhaust and fuel supply lines at a point when a measured value of the pressure reaches a preset pressure value.

5. The method for retaining the suspended state of the fuel cell power system according to claim 3, wherein after the step of closing the oxidant exhaust line, the step of applying a direct current is terminated with the step of closing the fuel exhaust and fuel supply lines at a point when the electric cell voltage with reference to the anode comes to a value of lower than a preset voltage.

6. The method for retaining the suspended state of the fuel cell power system according to claim 1, wherein while the fuel cell power system retains the power generation-suspended state, a step of opening the fuel supply line and supplying the fuel to the fuel cell stack is performed; a step of applying a direct current from the cathode to the anode is performed through the external circuit after the step of opening the fuel supply until the electric cell voltage with reference to the anode comes to a level of more than −1.2 V to less than 0.1 V; and a step of closing the fuel supply line is performed after the termination of the step of applying the direct current that is performed after the step of opening the fuel supply line.

7. The method for retaining the suspended state of the fuel cell power system according to claim 6, wherein the fuel cell system further includes a reformer that produces a hydrogen-rich gas from a hydrocarbon fuel, and a hydrogen storage tank that stores the produced hydrogen-rich gas, and wherein the fuel supplied in the suspended state fuel supply step is the hydrogen-rich gas produced in the reformer and stored in the hydrogen storage tank while the fuel cell system is in operation.

8. The method for retaining the suspended state of the fuel cell power system according to claim 1, wherein a magnitude of the direct current is controlled depending on a temperature of the reformer.

9. The method for retaining the suspended state of the fuel cell power system according to claim 1, wherein a combustion device is provided in the oxidant exhaust line and hydrogen in exhaust gas is burned in the combustion device.

10. A fuel cell power system comprising:
a fuel cell stack including a plurality of electric cells stacked one on top of another, each electric cell including an anode and a cathode with an electrolyte therebetween;
a fuel supply line and an oxidant supply line that respectively supply a fuel and an oxidant to the fuel cell stack;
a fuel exhaust line and an oxidant exhaust line that respectively exhaust the fuel and the oxidant supplied to the fuel cell stack;
an electrical control unit having a normal load operation mode in which electric energy generated in the fuel cell stack is delivered to an external load, and a current source mode in which a direct current applies from the cathode to the anode through an external circuit when the fuel cell stack has no electromotive force; and
a system control unit that controls the fuel supply line and oxidant supply line and the electrical control means,
wherein the system control unit is configured to close the oxidant supply line in the course of suspending power generation, to switch the electrical control unit from the load operation mode to the current source mode so as to apply the direct current from the cathode to the anode through the external circuit and to stop the electrical control unit at a point when the electric cell voltage with reference to the anode comes to a level of more than −1.2 V to less than 0.1 V, with the oxidant supply line closed in the course of suspending power generation, to close the oxidant exhaust line during the current source mode, and to close the fuel exhaust line and the fuel supply line after a point when the electrical control means is stopped at the current source mode.

11. The fuel cell power system according to claim 10, wherein the system control unit includes a memory in which an operational sequence program has been stored in advance, and a CPU that reads the sequence program and issues a control command through an input/output portion.

12. The fuel cell power system according to claim 10, further comprising a reformer provided in the fuel supply line and an air blower provided in the oxidant supply line, wherein the reformer and the air blower are controlled by the system controller so as to control the supplies of reformed gas from town gas used as the fuel and air used as the oxidant.

13. The fuel cell power system according to claim 12, wherein the fuel exhaust line and the oxidant exhaust line each has a combustion device downstream, in which the combustion device provided downstream in the fuel exhaust line is connected to the reformer through a heat exchanger.

14. The fuel cell power system according to claim 12, wherein the oxidant exhaust line has a pressure gauge that measures pressure of the cathode.

15. The fuel cell power system according to claim 12, further comprising a hydrogen storage tank between the reformer in the fuel supply line and the anode.

16. The fuel cell power system according to claim 10, further comprising a hydrogen storage tank provided in the fuel supply line and an air blower provided in the oxidant supply line, wherein the hydrogen storage tank and the air blower are controlled by the system controller so as to control the supplies of hydrogen used as the fuel and air used as the oxidant.

* * * * *